(12) United States Patent
Huang

(10) Patent No.: US 12,543,071 B2
(45) Date of Patent: Feb. 3, 2026

(54) COMMUNICATION METHOD AND APPARATUS

(71) Applicant: HUAWEI TECHNOLOGIES CO., LTD., Shenzhen (CN)

(72) Inventor: Qufang Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 387 days.

(21) Appl. No.: 18/150,975

(22) Filed: Jan. 6, 2023

(65) Prior Publication Data

US 2023/0164626 A1 May 25, 2023

Related U.S. Application Data

(63) Continuation of application No. PCT/CN2020/100506, filed on Jul. 6, 2020.

(51) Int. Cl.
*H04W 28/06* (2009.01)
*H04W 28/08* (2023.01)

(52) U.S. Cl.
CPC ..... *H04W 28/065* (2013.01); *H04W 28/0975* (2020.05)

(58) Field of Classification Search
CPC ............ H04W 28/065; H04W 28/0975; H04L 65/65; H04L 65/80; H04L 47/28
See application file for complete search history.

(56) References Cited

U.S. PATENT DOCUMENTS

| | | | |
|---|---|---|---|
| 10,425,508 B1 | 9/2019 | Patel et al. | |
| 2014/0293825 A1* | 10/2014 | Kalkunte | H04L 43/0852 370/474 |

(Continued)

FOREIGN PATENT DOCUMENTS

| | | | | |
|---|---|---|---|---|
| CN | 1123980 A | * | 6/1996 | ............ H04W 76/20 |
| CN | 101742430 A | | 6/2010 | |

(Continued)

OTHER PUBLICATIONS

Nokia et al., "Vertical_LAN TSN related CR for non-FASMO corrections", Sa WG2 Meeting #137E S2-2002570, Feb. 27, 2020, total 23 pages.
Ericsson, "TSC AI clarifications—meaning of arrival time", 3GPP TSG-RAN WG2 #109-e Tdoc R2-2000790, Mar. 6, 2020, total 5 pages.
International Search Report issued in corresponding International Application No. PCT/CN2020/100506, dated Mar. 25, 2021, pp. 1-9.

(Continued)

*Primary Examiner* — Jason E Mattis
*Assistant Examiner* — Robert Ma
(74) *Attorney, Agent, or Firm* — HAUPTMAN HAM, LLP

(57) ABSTRACT

A communication method and apparatus are provided. The method includes: A first communication apparatus receives a plurality of data packets from a second communication apparatus, where the plurality of data packets are data packets of a first service, the plurality of data packets are data packets in a plurality of periods, and a length of the periods of the plurality of data packets is less than a maximum delay of the first service; and the first communication apparatus centrally reports the plurality of data packets to a third communication apparatus after an end moment of a first time period, where a length of the first time period is not greater than the maximum delay of the first service. By implementing the centralized reporting method, data packet transmission efficiency can be improved, and data scheduling complexity can be reduced.

15 Claims, 10 Drawing Sheets

(56) References Cited

U.S. PATENT DOCUMENTS

| | | | | |
|---|---|---|---|---|
| 2015/0139074 A1* | 5/2015 | Bane | ............... | H04L 41/5009 370/328 |
| 2020/0184997 A1* | 6/2020 | Lawson | ............. | H04L 27/0012 |
| 2022/0030641 A1* | 1/2022 | Wang | ................ | H04W 40/02 |

FOREIGN PATENT DOCUMENTS

| | | | | |
|---|---|---|---|---|
| CN | 102843344 A | | 12/2012 | |
| CN | 104301435 A | | 1/2015 | |
| CN | 108616462 A | | 10/2018 | |
| CN | 109088867 A | | 12/2018 | |
| CN | 109618301 A | | 4/2019 | |
| JP | 2008141254 A | * | 6/2008 | |
| WO | WO-2012103701 A1 | * | 8/2012 | ............ H04W 4/38 |
| WO | WO-2018129938 A1 | * | 7/2018 | ............ H04W 28/06 |

OTHER PUBLICATIONS

Chinese Office Action issued in corresponding Chinese Application No. 202080102563.5, dated Jun. 22, 2024, pp. 1-11.
CATT, PTP 1588 support in 5GS/TSN. 3GPP TSG-RAN WG2 Meeting #104, Spokane, USA, Nov. 12-16, 2018, R2-1816360, 5 pages.
Nokia, Nokia Shanghai Bell, Tencent, Huawei, Vertical_LAN TSN related CR for non-FASMO corrections. SA WG2 Meeting #137E, Elbonia, Feb. 24-27, 2020, S2-2002570, 22 pages.
Ericsson, TSN traffic patterns. 3GPP TSG-RAN WG2 #105, Athens, Greece, Feb. 25-Mar. 1, 2019, R2-1901299, 7 pages.
Siemens, Guaranteed Latency for Control-Data-Traffic in Time Sensitive Networks. IEEE 802.1 TSN TG Meeting York—England, Sep. 4, 2013—v01—, 13 pages.
Extended European Search Report issued in corresponding European Application No. 20944764.8, dated Jul. 11, 2023, pp. 1-14.
Chinese Offce Action issued in corresponding Chinese Application No. 202080102563.5, dated Jan. 25, 2025, pp. 1-12.

* cited by examiner

COMMUNICATION METHOD AND APPARATUS

CROSS-REFERENCE TO RELATED APPLICATIONS

This application is a continuation of International Application No. PCT/CN2020/100506, filed on Jul. 6, 2020, the disclosure of which is hereby incorporated by reference in its entirety.

TECHNICAL FIELD

Embodiments of this application relate to the field of communication technologies, and in particular, to a communication method and apparatus.

BACKGROUND

With continuous evolution of a mobile communication system, the system can provide a larger transmission capacity and a smaller transmission delay for data packets. Therefore, the mobile communication system objectively is capable of transmitting information in an industrial control system. In addition, with continuous development of industrial automation, industrial production is gradually evolving toward flexible productivity and small-batch production. In an industrial scenario, a wired system is used for transmission of control information, and therefore a production system is not flexible enough to adapt to small-batch and diversified production requirements. Therefore, a requirement for a wireless network system in an industrial scenario becomes more urgent.

For application of a $3^{rd}$ generation partnership project (3GPP) network in the industrial control system, an industrial internet of things (IIoT) feature is introduced in 5G R16. Via a 5G communication system, various functional nodes in the industrial control system are connected, including an industrial controller that sends a control command, an operation arm that receives the control command, a configuration unit that configures the nodes such as the controller and the operation arm, and the like. The 5G system provides flexible routing, allowing various industrial controllers and operation arms to be quickly organized into different production lines. This achieves flexible deployment and adapts to the small-batch and diversified production requirements. How to transmit a data packet between a plurality of communication apparatuses is a technical problem to be resolved in embodiments of this application.

SUMMARY

Embodiments of this application provide a communication method and apparatus, to resolve a technical problem of transmitting a data packet between different communication apparatuses.

According to a first aspect, a communication method is provided. The method is performed by a first communication apparatus, which may be a communication device, or a component (a chip, a circuit, or the like) in the communication device. The method includes: The first communication apparatus receives a plurality of data packets from a second communication apparatus, where the plurality of data packets are data packets of a first service, the plurality of data packets are data packets in a plurality of periods, and a length of the periods of the plurality of data packets is less than a maximum delay of the first service; and the first communication apparatus reports the plurality of data packets to a third communication apparatus after an end moment of a first time period, where a length of the first time period is not greater than the maximum delay of the first service.

By implementing the foregoing method, the first communication apparatus centrally reports the plurality of data packets to the third communication apparatus, to improve transmission efficiency and reduce data scheduling complexity.

In a possible implementation, the first time period is implemented by using a timer. The first communication apparatus starts the timer when receiving the $1^{st}$ data packet from the second communication apparatus, and reports the plurality of received data packets to the third communication apparatus after the timer expires. Duration of the timer is less than or equal to the maximum delay of the first service.

In another possible implementation, the first time period is implemented by using a counter. The first communication apparatus starts the counter when receiving the $1^{st}$ data packet from the third communication apparatus, where a count value is increased by 1 each time the first communication apparatus receives a data packet, and reports the plurality of data packets to the third communication apparatus when the count value reaches a threshold or a threshold value, where the threshold or the threshold value is determined based on the length of the periods of the data packets and the maximum delay of the first service. For example, if the maximum delay of the first service is 200 ms, and the length of the periods is 5 ms, a value of the threshold or the threshold value is 40.

By implementing the foregoing method, in addition to a timer manner, a counter manner may also be used, so that manners are diversified, and requirements of different scenarios are met.

Optionally, the first communication apparatus may delete time information of a second data packet in the plurality of data packets, where the second data packet is a data packet whose time information needs to be deleted in the plurality of data packets; and report the plurality of data packets to the third communication apparatus.

By implementing the foregoing method, because the time information is not transmitted through a wireless interface, a data transmission amount of a wireless communication system, especially the wireless interface, is reduced.

In a possible implementation, the deleting time information of a second data packet in the plurality of data packets specifically includes: The first communication apparatus determines the second data packet based on parameters of the plurality of data packets; and the first communication apparatus deletes the time information at a first location in the second data packet, where the first location is pre-configured.

The second data packet whose time information needs to be deleted may be determined based on the parameter of the data packet, and no additional indication information needs to be sent, to reduce overheads.

In a possible implementation, the deleting time information of a second data packet in the plurality of data packets includes: The first communication apparatus determines the second data packet by using an artificial intelligence AI algorithm; the first communication apparatus determines a first location of the time information in the second data packet by using the AI algorithm; and the first communication apparatus deletes the time information of the second data packet at the first location.

By implementing the foregoing method, the second data packet whose time information is to be deleted and a location of the to-be-deleted time information in the second data packet are determined by using the AI algorithm, and accuracy is high through long-time AI training.

Optionally, the second data packet includes first indication information, and the first indication information indicates a data packet whose time information has been deleted.

By implementing the foregoing method, the first indication information is directly carried in a data packet whose time information needs to be deleted, and another parameter, for example, a MAC address, a source address, a destination port, or a source port number, of the data packet is no longer limited. The first communication apparatus may delete time information of any data packet by including the first indication information in the data packet, so that flexibility is high.

According to a second aspect, a communication method is provided. The method is performed by a third communication apparatus, which may be a communication device, or a component (a chip, a circuit, or the like) disposed in the communication device. The method includes: The third communication apparatus receives a plurality of data packets from a first communication apparatus after an end moment of a first time period, where the plurality of data packets are data packets of a first service, the plurality of data packets are data packets in a plurality of periods, a length of the periods of the plurality of data packets is less than a maximum delay of the first service, and a length of the first time period is not greater than the maximum delay of the first service.

By implementing the foregoing method, the plurality of data packets are centrally transmitted, to reduce overheads required for data transmission and improve wireless transmission efficiency.

In a possible implementation, the third communication apparatus adds time information to a second data packet in the plurality of data packets, where the second data packet is a data packet whose time information is deleted in the plurality of data packets.

In a possible implementation, the adding time information to a second data packet in the plurality of data packets includes: The third communication apparatus determines the second data packet based on parameters of the plurality of data packets; and the third communication apparatus adds the time information at a first location in the second data packet, where the first location is pre-configured.

In a possible implementation, the adding time information to a second data packet in the plurality of data packets includes: The third communication apparatus determines, in the plurality of data packets, the second data packet carrying first indication information, where the first indication information indicates a data packet whose time information is deleted; and the third communication apparatus adds the time information at a first location in the second data packet, where the first location is pre-configured.

In a possible implementation, the adding time information to a second data packet in the plurality of data packets includes: The third communication apparatus determines, by using an artificial intelligence AI algorithm, the second data packet whose time information is deleted in the plurality of data packets; the third communication apparatus determines a first location in the second data packet by using the AI algorithm; and the third communication apparatus adds the time information at the first location in the second data packet.

Optionally, the method further includes: The third communication apparatus determines the time information of the second data packet based on the sending periods of the plurality of data packets. Alternatively, the third communication apparatus determines receiving time of a first data packet, where the first data packet is the $1^{st}$ data packet in the plurality of data packets; and determines the time information of the second data packet based on the receiving time and a transmission delay of the first data packet.

According to a third aspect, a communication method is provided. The method is performed by a first communication apparatus, which may be a communication device, or a component (a chip, a circuit, or the like) in the communication device. The method includes: The first communication apparatus receives a third data packet from a second communication apparatus; the first communication apparatus deletes time information in the third data packet; and the first communication apparatus sends a fourth data packet to a third communication apparatus, where the fourth data packet is a data packet obtained by deleting the time information from the third data packet.

By implementing the foregoing method, because the time information is not transmitted through a wireless interface, a data transmission amount of a wireless communication system, especially the wireless interface, is reduced.

In a possible implementation, the deleting time information in the third data packet includes: The first communication apparatus obtains a parameter of the third data packet. When the parameter meets a preset condition, the first communication apparatus deletes the time information at a first location in the third data packet, where the first location is pre-configured.

In a possible implementation, the deleting time information in the third data packet includes: The first communication apparatus determines, by using an artificial intelligence AI algorithm, that the third data packet includes to-be-deleted time information; the first communication apparatus determines a first location of the time information in the third data packet by using the AI algorithm; and the first communication apparatus deletes the time information at the first location.

Optionally, the fourth data packet carries first indication information, and the first indication information indicates that the time information has been deleted from the fourth data packet.

According to a fourth aspect, a communication method is provided. The method is performed by a third communication apparatus, which may be a communication device, or a component (a chip, a circuit, or the like) in the communication device. The method includes: The third communication apparatus receives a fourth data packet from a first communication apparatus, where time information is deleted from the fourth data packet; and the third communication apparatus adds the time information to the fourth data packet.

By implementing the foregoing method, a sender, namely, the first communication apparatus, deletes time information of a data packet and then transmits the data packet, and a receiver, namely, the third communication apparatus, performs an operation of supplementing time information after receiving the data packet, so that overheads of transmitting the data packet over an air interface can be reduced, and spectrum utilization can be improved.

Optionally, the adding the time information to the fourth data packet includes: The third communication apparatus obtains a parameter of the fourth data packet. When the parameter meets a preset condition, the third communication apparatus adds the time information at a first location in the fourth data packet, where the first location is pre-configured.

Optionally, the adding the time information to the fourth data packet includes: when the fourth data packet includes first indication information, the third communication apparatus adds the time information at a first location in the fourth data packet, where the first indication information indicates that the time information has been deleted from the fourth data packet, and the first location is specified in a protocol.

Optionally, the adding the time information to the fourth data packet includes: The third communication apparatus determines, by using an artificial intelligence AI algorithm, that the fourth data packet is a data packet whose time information is deleted; the third communication apparatus determines a first location in the fourth data packet by using the AI algorithm; and the third communication apparatus adds the time information at the first location in the fourth data packet.

Optionally, the method further includes: The third communication apparatus determines the time information based on a sending periodicity of the fourth data packet. Alternatively, the third communication apparatus determines receiving time of the fourth data packet; and determines the time information based on the receiving time and a transmission delay of the fourth data packet.

According to a fifth aspect, a communication method is provided. The method is performed by a first communication apparatus, which may be a communication device, or a component (a chip, a circuit, or the like) in the communication device. The method includes: The first communication apparatus generates a fifth data packet; the first communication apparatus sends the fifth data packet to a second communication apparatus; the first communication apparatus receives a sixth data packet from a third communication apparatus; and the first communication apparatus determines, based on the fifth data packet and the sixth data packet, whether to transmit the sixth data packet to the second communication apparatus.

By implementing the foregoing method, a sender, namely, the first communication apparatus, predicts data packet content, and generates a predicted data packet. Before a real data packet arrives, the predicted data packet is sent first, so that a data transmission delay can be reduced.

Optionally, the determining, based on the fifth data packet and the sixth data packet, whether to transmit the sixth data packet to the second communication apparatus includes: If the fifth data packet is the same as the sixth data packet, the first communication apparatus no longer transmits the sixth data packet to the second communication apparatus; or if the fifth data packet is different from the sixth data packet, the first communication apparatus transmits the sixth data packet to the second communication apparatus.

By implementing the foregoing method, the sender sends only a data packet whose real packet is different from a predicted packet, so that air interface overheads can be further reduced on the basis of reducing the data transmission delay.

Optionally, a quantity of fifth data packets is N1, a quantity of sixth data packets is N2, and both N1 and N2 are positive integers. When some of the N1 fifth data packets are different from some of the N2 sixth data packets, the sixth data packets that are different from the fifth data packets are transmitted to the second communication apparatus.

By implementing the foregoing method, when a plurality of data packets are sent together, the sender sends only some different data packets, instead of resending all the data packets, to reduce air interface overheads.

Optionally, the method further includes: If the quantity of fifth data packets is greater than the quantity of sixth data packets, the first communication apparatus sends a notification message to the second communication apparatus, where the notification message is used to notify the second communication apparatus to delete redundant fifth data packets.

By implementing the foregoing method, when the predicted data packets are more than the real data packets, the sender notifies a receiver to delete redundant data packets, to prevent the receiver from performing an incorrect operation, and ensure security of industrial control.

According to a sixth aspect, a communication method is provided. The method is performed by a second communication apparatus, which may be a communication device, or a component (a chip, a circuit, or the like) in the communication device. The method includes: The second communication apparatus receives a fifth data packet from a first communication apparatus; and the second communication apparatus delivers a sixth data packet to an application layer when receiving the sixth data packet; otherwise, the second communication apparatus delivers the fifth data packet to the application layer.

By implementing the foregoing method, if a receiver, namely, a second communication apparatus, receives a real data packet, the second communication apparatus delivers the real data packet to the application layer; otherwise, the second communication apparatus delivers a predicted data packet. Because the predicted data packet arrives earlier, a data transmission delay can be reduced.

Optionally, if the sixth data packet is received, the method further includes: The second communication apparatus deletes the fifth data packet.

According to a seventh aspect, a communication method is provided. The method is performed by a first communication apparatus, which may be a communication device, or a component (a chip, a circuit, or the like) in the communication device. The method includes: The first communication apparatus generates a seventh data packet; the first communication apparatus receives an eighth data packet from a second communication apparatus; and the first communication apparatus determines, based on the seventh data packet and the eighth data packet, whether to transmit the eighth data packet to a third communication apparatus.

By implementing the foregoing method, a sender and a receiver, namely, the first communication apparatus and the third communication apparatus, simultaneously start a data packet prediction function, and both perform data packet prediction. In this case, the sender and the receiver only need to transmit a real data packet that is different from a predicted data packet, and do not need to transmit the predicted data packet, to further reduce signaling overheads and a data delay. Optionally, the first communication apparatus and the second communication apparatus may predict a data packet by using an AI algorithm.

Optionally, the determining, based on the seventh data packet and the eighth data packet, whether to transmit the eighth data packet to the third communication apparatus includes: If the eighth data packet is the same as the seventh data packet, the first communication apparatus no longer transmits the eighth data packet to the third communication apparatus; or if the eighth data packet is different from the seventh data packet, the first communication apparatus transmits the eighth data packet to the third communication apparatus.

According to an eighth aspect, a communication method is provided. The method is performed by a third communication apparatus, which may be a communication device, or a component (a chip, a circuit, or the like) in the communication device. The method includes: The third communication apparatus generates a seventh data packet; and if receiving an eighth data packet from a first communication apparatus, the third communication apparatus delivers the eighth data packet to an application layer; otherwise, the third communication apparatus delivers the seventh data packet to the application layer.

By implementing the foregoing method, a receiver, namely, the third communication apparatus, introduces a data packet prediction function, to further reduce an amount of data transmitted in a network and improve system efficiency.

Optionally, if the eighth data packet is delivered to the application layer, the method further includes: The third communication apparatus deletes the seventh data packet.

According to a ninth aspect, at least one embodiment of this application further provides an apparatus. For beneficial effects, refer to descriptions in the first aspect. The apparatus has functions of implementing behavior in at least one method embodiment in the first aspect. The functions may be implemented by executing corresponding hardware or software. The hardware or the software may include one or more units corresponding to the foregoing functions. In a possible design, the apparatus includes: a communication unit, configured to receive a plurality of data packets from a second communication apparatus, where the plurality of data packets are data packets of a first service, the plurality of data packets are data packets in a plurality of periods, and a length of the periods of the plurality of data packets is less than a maximum delay of the first service. The communication unit is further configured to report the plurality of data packets to a third communication apparatus after an end moment of a first time period, where a length of the first time period is not greater than the maximum delay of the first service. These units may perform the corresponding functions in the method example in the first aspect. For details, refer to the detailed descriptions in the method example. Details are not described herein again.

According to a tenth aspect, at least one embodiment of this application further provides an apparatus. For beneficial effects, refer to descriptions in the second aspect. The apparatus has functions of implementing behavior in at least one method embodiment in the second aspect. The functions may be implemented by executing corresponding hardware or software. The hardware or the software may include one or more modules corresponding to the foregoing functions. In a possible design, the apparatus includes: a communication unit, configured to receive a plurality of data packets from a first communication apparatus after an end moment of a first time period, where the plurality of data packets are data packets of a first service, the plurality of data packets are data packets in a plurality of periods, a length of the periods of the plurality of data packets is less than a maximum delay of the first service, and a length of the first time period is not greater than the maximum delay of the first service. These units may perform the corresponding functions in the method example in the second aspect. For details, refer to the detailed descriptions in the method example. Details are not described herein again.

According to an eleventh aspect, at least one embodiment of this application further provides an apparatus. For beneficial effects, refer to descriptions in the third aspect. The apparatus has functions of implementing behavior in at least one method embodiment in the second aspect. The functions may be implemented by executing corresponding hardware or software. The hardware or the software may include one or more modules corresponding to the foregoing functions. In a possible design, the apparatus includes: a communication unit, configured to receive a third data packet from a second communication apparatus; and a processing unit, configured to delete time information of the third data packet. The communication unit is further configured to send a fourth data packet to a third communication apparatus, where the fourth data packet is a data packet obtained by deleting the time information from the third data packet. These units may perform the corresponding functions in the method example in the third aspect. For details, refer to the detailed descriptions in the method example. Details are not described herein again.

According to a twelfth aspect, at least one embodiment of this application further provides an apparatus. For beneficial effects, refer to descriptions in the fourth aspect. The apparatus has functions of implementing behavior in at least one method embodiment in the second aspect. The functions may be implemented by executing corresponding hardware or software. The hardware or the software may include one or more modules corresponding to the foregoing functions. In a possible design, the apparatus includes: a communication unit, configured to receive a fourth data packet from a first communication apparatus, where time information is deleted from the fourth data packet; and a processing unit, configured to add time information to the fourth data packet. These units may perform the corresponding functions in the method example in the fourth aspect. For details, refer to the detailed descriptions in the method example. Details are not described herein again.

According to a thirteenth aspect, at least one embodiment of this application further provides an apparatus. For beneficial effects, refer to descriptions in the fifth aspect. The apparatus has functions of implementing behavior in at least one method embodiment in the fifth aspect. The functions may be implemented by executing corresponding hardware or software. The hardware or the software may include one or more modules corresponding to the foregoing functions. In a possible design, the apparatus includes: a processing unit, configured to generate a fifth data packet; and a communication unit, configured to send the fifth data packet to a second communication apparatus. The communication unit is further configured to receive a sixth data packet from a third communication apparatus; and the processing unit is further configured to determine, based on the fifth data packet and the sixth data packet, whether to transmit the sixth data packet to the second communication apparatus. These units may perform the corresponding functions in the method example in the fifth aspect. For details, refer to the detailed descriptions in the method example. Details are not described herein again.

According to a fourteenth aspect, at least one embodiment of this application further provides an apparatus. For beneficial effects, refer to descriptions in the sixth aspect. The apparatus has functions of implementing behavior in at least one method embodiment in the sixth aspect. The functions may be implemented by executing corresponding hardware or software. The hardware or the software may include one or more modules corresponding to the foregoing functions. In a possible design, the apparatus includes: a communication unit, configured to receive a fifth data packet from a first communication apparatus. The communication unit is configured to deliver a sixth data packet to an application layer when receiving the sixth data packet; otherwise, the communication unit is configured to deliver the fifth data packet to the application layer. These units may perform the corresponding functions in the method example in the sixth aspect. For details, refer to the detailed descriptions in the method example. Details are not described herein again.

According to a fifteenth aspect, at least one embodiment of this application further provides an apparatus. For beneficial effects, refer to descriptions in the seventh aspect. The apparatus has functions of implementing behavior in at least one method embodiment in the seventh aspect. The functions may be implemented by executing corresponding hardware or software. The hardware or the software may include one or more modules corresponding to the foregoing functions. In a possible design, the apparatus includes: a processing unit, configured to generate a seventh data packet; and a communication unit, configured to receive an eighth data packet from a second communication apparatus. The processing unit is configured to determine, based on the seventh data packet and the eighth data packet, whether to transmit the eighth data packet to a third communication apparatus. These units may perform the corresponding functions in the method example in the seventh aspect. For details, refer to the detailed descriptions in the method example. Details are not described herein again.

According to a sixteenth aspect, at least one embodiment of this application further provides an apparatus. For beneficial effects, refer to descriptions in the eighth aspect. The apparatus has functions of implementing behavior in at least one method embodiment in the second aspect. The functions may be implemented by executing corresponding hardware or software. The hardware or the software may include one or more modules corresponding to the foregoing functions. In a possible design, the apparatus includes: a processing unit, configured to generate a seventh data packet; and a communication unit, configured to: if receiving an eighth data packet from a first communication apparatus, deliver the eighth data packet to an application layer; otherwise, deliver the seventh data packet to the application layer. These units may perform the corresponding functions in the method example in the eighth aspect. For details, refer to the detailed descriptions in the method example. Details are not described herein again.

According to a seventeenth aspect, an apparatus is provided. The apparatus may be the first communication apparatus in at least one method embodiment of the first aspect. The apparatus includes a communication interface and a processor. Optionally, the apparatus further includes a memory. The memory is configured to store a computer program or instructions. The processor is coupled to the memory and the communication interface. When the processor executes the computer program or the instructions, the apparatus is enabled to perform the method performed by the first communication apparatus in at least one method embodiment of the first aspect.

According to an eighteenth aspect, an apparatus is provided. The apparatus may be the third communication apparatus in at least one method embodiment of the second aspect. The apparatus includes a communication interface and a processor. Optionally, the apparatus further includes a memory. The memory is configured to store a computer program or instructions. The processor is coupled to the memory and the communication interface. When the processor executes the computer program or the instructions, the apparatus is enabled to perform the method performed by the third communication apparatus in at least one method embodiment of the second aspect.

According to a nineteenth aspect, an apparatus is provided. The apparatus may be the first communication apparatus in at least one method embodiment of the third aspect. The apparatus includes a communication interface and a processor. Optionally, the apparatus further includes a memory. The memory is configured to store a computer program or instructions. The processor is coupled to the memory and the communication interface. When the processor executes the computer program or the instructions, the apparatus is enabled to perform the method performed by the first communication apparatus in at least one method embodiment of the third aspect.

According to a twentieth aspect, an apparatus is provided. The apparatus may be the third communication apparatus in at least one method embodiment of the fourth aspect. The apparatus includes a communication interface and a processor. Optionally, the apparatus further includes a memory. The memory is configured to store a computer program or instructions. The processor is coupled to the memory and the communication interface. When the processor executes the computer program or the instructions, the apparatus is enabled to perform the method performed by the third communication apparatus in at least one method embodiment of the fourth aspect.

According to a twenty-first aspect, an apparatus is provided. The apparatus may be the first communication apparatus in at least one method embodiment of the fifth aspect. The apparatus includes a communication interface and a processor. Optionally, the apparatus further includes a memory. The memory is configured to store a computer program or instructions. The processor is coupled to the memory and the communication interface. When the processor executes the computer program or the instructions, the apparatus is enabled to perform the method performed by the first communication apparatus in at least one method embodiment of the fifth aspect.

According to a twenty-second aspect, an apparatus is provided. The apparatus may be the second communication apparatus in at least one method embodiment of the sixth aspect. The apparatus includes a communication interface and a processor. Optionally, the apparatus further includes a memory. The memory is configured to store a computer program or instructions. The processor is coupled to the memory and the communication interface. When the processor executes the computer program or the instructions, the apparatus is enabled to perform the method performed by the second communication apparatus in at least one method embodiment of the sixth aspect.

According to a twenty-third aspect, an apparatus is provided. The apparatus may be the first communication apparatus in at least one method embodiment of the seventh aspect. The apparatus includes a communication interface and a processor. Optionally, the apparatus further includes a memory. The memory is configured to store a computer program or instructions. The processor is coupled to the memory and the communication interface. When the processor executes the computer program or the instructions, the apparatus is enabled to perform the method performed by the first communication apparatus in at least one method embodiment of the seventh aspect.

According to a twenty-fourth aspect, an apparatus is provided. The apparatus may be the third communication apparatus in at least one method embodiment of the eighth aspect. The apparatus includes a communication interface and a processor. Optionally, the apparatus further includes a memory. The memory is configured to store a computer program or instructions. The processor is coupled to the memory and the communication interface. When the processor executes the computer program or the instructions, the apparatus is enabled to perform the method performed by the third communication apparatus in at least one method embodiment of the eighth aspect.

According to a twenty-fifth aspect, a computer program product is provided. The computer program product includes computer program code. When the computer program code is run, the method performed by the first communication apparatus in the first aspect is performed.

According to a twenty-sixth aspect, a computer program product is provided. The computer program product includes computer program code. When the computer program code is run, the method performed by the third communication apparatus in the second aspect is performed.

According to a twenty-seventh aspect, a computer program product is provided. The computer program product includes computer program code. When the computer program code is run, the method performed by the first communication apparatus in the third aspect is performed.

According to a twenty-eighth aspect, a computer program product is provided. The computer program product includes computer program code. When the computer program code is run, the method performed by the third communication apparatus in the fourth aspect is performed.

According to a twenty-ninth aspect, a computer program product is provided. The computer program product includes computer program code. When the computer program code is run, the method performed by the first communication apparatus in the fifth aspect is performed.

According to a thirtieth aspect, a computer program product is provided. The computer program product includes computer program code. When the computer program code is run, the method performed by the second communication apparatus in the sixth aspect is performed.

According to a thirty-first aspect, a computer program product is provided. The computer program product includes computer program code. When the computer program code is run, the method performed by the first communication apparatus in the seventh aspect is performed.

According to a thirty-second aspect, a computer program product is provided. The computer program product includes computer program code. When the computer program code is run, the method performed by the third communication apparatus in the eighth aspect is performed.

According to a thirty-third aspect, this application provides a chip system. The chip system includes a processor, configured to implement the function of the first communication apparatus in the method of the first aspect. In a possible design, the chip system further includes a memory, configured to store program instructions and/or data. The chip system may include a chip, or may include a chip and another discrete component.

According to a thirty-fourth aspect, this application provides a chip system. The chip system includes a processor, configured to implement the function of the third communication apparatus in the method of the second aspect. In a possible design, the chip system further includes a memory, configured to store program instructions and/or data. The chip system may include a chip, or may include a chip and another discrete component.

According to a thirty-fifth aspect, this application provides a chip system. The chip system includes a processor, configured to implement the function of the first communication apparatus in the method of the third aspect. In a possible design, the chip system further includes a memory, configured to store program instructions and/or data. The chip system may include a chip, or may include a chip and another discrete component.

According to a thirty-sixth aspect, this application provides a chip system. The chip system includes a processor, configured to implement the function of the third communication apparatus in the method of the fourth aspect. In a possible design, the chip system further includes a memory, configured to store program instructions and/or data. The chip system may include a chip, or may include a chip and another discrete component.

According to a thirty-seventh aspect, this application provides a chip system. The chip system includes a processor, configured to implement the function of the first communication apparatus in the method of the fifth aspect. In a possible design, the chip system further includes a memory, configured to store program instructions and/or data. The chip system may include a chip, or may include a chip and another discrete component.

According to a thirty-eighth aspect, this application provides a chip system. The chip system includes a processor, configured to implement the function of the second communication apparatus in the method of the sixth aspect. In a possible design, the chip system further includes a memory, configured to store program instructions and/or data. The chip system may include a chip, or may include a chip and another discrete component.

According to a thirty-ninth aspect, this application provides a chip system. The chip system includes a processor, configured to implement the function of the first communication apparatus in the method of the seventh aspect. In a possible design, the chip system further includes a memory, configured to store program instructions and/or data. The chip system may include a chip, or may include a chip and another discrete component.

According to a fortieth aspect, this application provides a chip system. The chip system includes a processor, configured to implement the function of the third communication apparatus in the method of the eighth aspect. In a possible design, the chip system further includes a memory, configured to store program instructions and/or data. The chip system may include a chip, or may include a chip and another discrete component.

According to a forty-first aspect, this application provides a computer-readable storage medium. The computer-readable storage medium stores a computer program. When the computer program is run, the method performed by the first communication apparatus in the first aspect is implemented.

According to a forty-second aspect, this application provides a computer-readable storage medium. The computer-readable storage medium stores a computer program. When the computer program is run, the method performed by the third communication apparatus in the second aspect is implemented.

According to a forty-third aspect, this application provides a computer-readable storage medium. The computer-readable storage medium stores a computer program. When the computer program is run, the method performed by the first communication apparatus in the third aspect is implemented.

According to a forty-fourth aspect, this application provides a computer-readable storage medium. The computer-readable storage medium stores a computer program. When the computer program is run, the method performed by the third communication apparatus in the fourth aspect is implemented.

According to a forty-fifth aspect, this application provides a computer-readable storage medium. The computer-readable storage medium stores a computer program. When the computer program is run, the method performed by the first communication apparatus in the fifth aspect is implemented.

According to a forty-sixth aspect, this application provides a computer-readable storage medium. The computer-readable storage medium stores a computer program. When the computer program is run, the method performed by the second communication apparatus in the sixth aspect is implemented.

According to a forty-seventh aspect, this application provides a computer-readable storage medium. The computer-readable storage medium stores a computer program. When the computer program is run, the method performed by the first communication apparatus in the seventh aspect is implemented.

According to a forty-eighth aspect, this application provides a computer-readable storage medium. The computer-readable storage medium stores a computer program. When the computer program is run, the method performed by the third communication apparatus in the eighth aspect is implemented.

DESCRIPTION OF EMBODIMENTS

Figure 1:
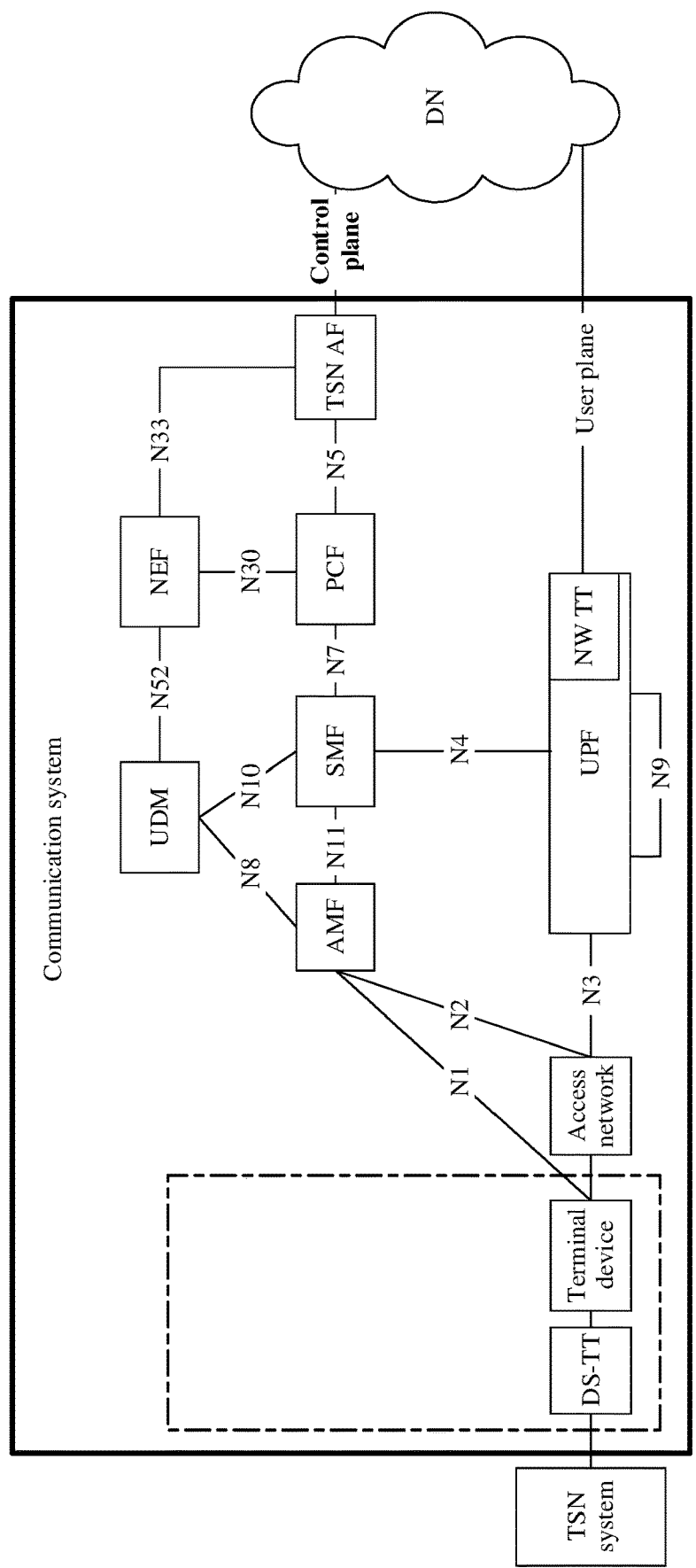
FIG. 1 is a schematic diagram of a network architecture according to at least one embodiment of this application.

FIG. 1 is a system architectural diagram of the industrial internet of things (IIoT), and includes at least one of the following: a time-sensitive network (TSN) system, a communication system, and a data network (DN).

I. Communication System

The communication system includes an access network device and a core network device. The access network device may also be referred to as a radio access network (RAN) device. Different access network devices may be connected through an Xn interface, and the access network device may be connected to the core network device through an NG interface.

The access network device is a device that connects a terminal device to a wireless network, and may provide the terminal device with functions such as radio resource management, quality of service management, and data encryption and compression. For example, the access network device may include the following several types:

1. next generation NodeB (gNB), which provides the terminal device with a protocol and a function on a control plane and/or a user plane of a new radio (NR), and accesses a core network, for example, a 5G core (5GC); and 2. next generation evolved NodeB (ng-eNB), which provides the terminal device with a protocol and a function on a control plane and/or a user plane of evolved universal terrestrial radio access (E-UTRA), and accesses the core network, for example, the 5GC.

Figure 2:
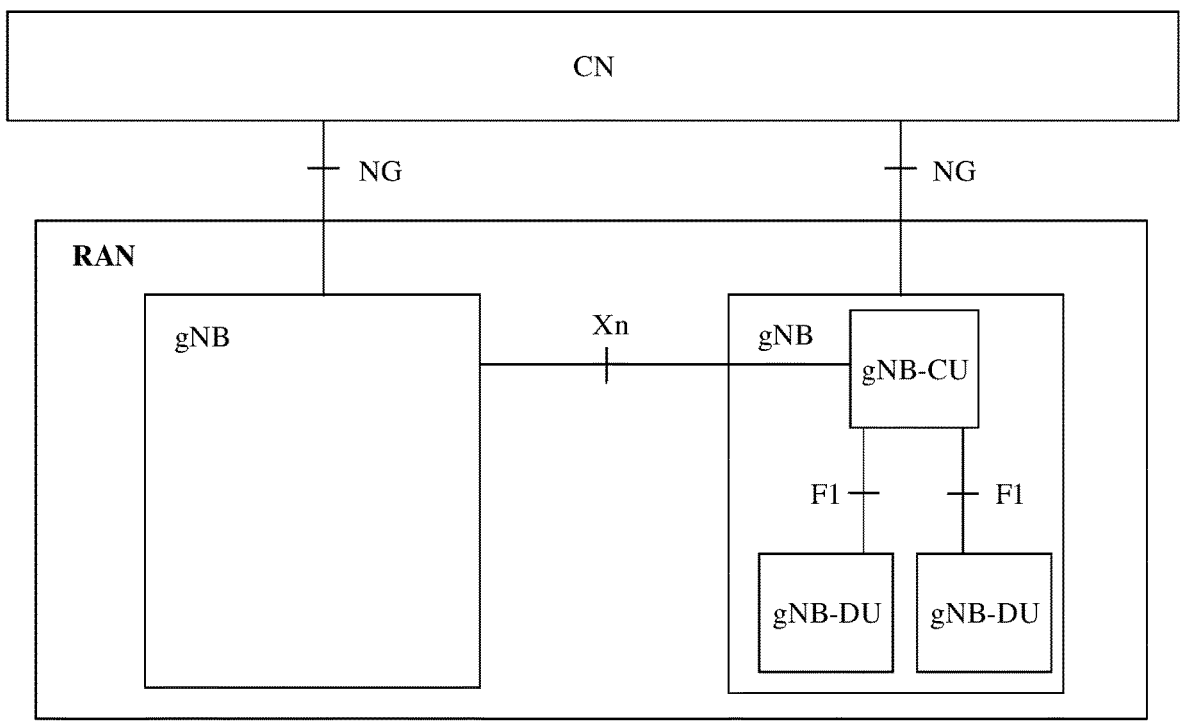
FIG. 2 is a schematic diagram of an access network device according to at least one embodiment of this application.

Further, as shown in FIG. 2, an access network device may include a central unit (CU) and a distributed unit (DU). In other words, functions of an original access network device may be split. Some functions of the original access network device are disposed on the CU, and some remaining functions are deployed on the DU. A plurality of DUs share one CU, to reduce costs and facilitate network expansion. Optionally, functions of the CU and the DU may be classified based on protocol stacks. For example, a radio resource control (RRC) layer, a service data adaptation protocol (SDAP) layer, and a packet data convergence protocol (PDCP) layer are deployed on the CU. Other layers such as a radio link control (RLC) layer, a medium access control (MAC) layer, and a physical (PHY) layer are deployed on the DU. The CU and the DU may be connected through an FI interface. The CU, representing the access network device, may be connected to a core network through an NG interface, or the CU, representing the access network device, may be connected to another access network device through an Xn interface. Further, functions of the CU may be classified into the following:

1. A central unit-control plane (CU-CP) mainly includes control planes of the RRC layer and the PDCP layer on the CU.

2. A central unit-user plane (CU-UP) mainly includes user planes of the SDAP layer and the PDCP layer on the CU.

The core network device is mainly configured to: manage a terminal device and provide a gateway for communication with an external network. The core network device may include one or more of the following network elements.

A user plane function (UPF) network element is mainly responsible for forwarding and receiving user data. In downlink transmission, the UPF network element may receive user data from a data network (DN), and transmit the user data to the terminal device through the access network device. In uplink transmission, the UPF network element may receive user data from the terminal device through the access network device, and forward the user data to a DN. Optionally, transmission resources and scheduling functions in the UPF network element that provide services for the terminal device may be managed and controlled by an SMF network element. A PCF network element mainly supports providing a unified policy framework to control network behavior, and providing a policy rule for a control layer network function, and is responsible for obtaining policy decision-related subscription information of a user.

An access and mobility management function (AMF) network element is mainly responsible for mobility management in a mobile network, for example, user location update, registration of a user with a network, and user handover.

The session management function (SMF) network element is mainly responsible for session management in the mobile network, for example, session establishment, modification, and release. For example, specific functions are allocation of an IP address for the user and selection of a UPF network element that provides a packet forwarding function.

The policy control function (PCF) network element mainly supports providing a unified policy framework to control network behavior, and providing a policy rule for a control layer network function, and is responsible for obtaining policy decision-related subscription information of a user.

A TSN application function (AF) network element mainly supports interacting with a 3GPP core network to provide a service, for example, to affect a data routing decision and a policy control function, or provide some third-party services for a network side.

A unified data management (UDM) network element is mainly configured to generate an authentication credential, process a user identifier (for example, store and manage a permanent identity of the user), control access authorization, manage subscription data, and the like.

A network exposure function (NEF) network element is configured to: provide a framework, authentication, and an interface that are related to network capability exposure, and transfer information between a 5G system network function and another network function.

It should be noted that the network elements in the foregoing core network may have different names in different communication systems. In the schematic diagram shown in FIG. 1, a 5$^{th}$ generation mobile communication system is used as an example for description, and is not intended to limit this application.

Optionally, the communication system shown in FIG. 1 may further include a terminal device. The terminal device may be referred to as a terminal for short, and is a device having a wireless transceiver function. The terminal device may be deployed on land, including being deployed indoor or outdoor or being handheld or vehicle-mounted; may be deployed on water (for example, on a ship); or may be deployed in the air (for example, on a plane, a balloon, or a satellite). The terminal device may be a mobile phone, a tablet computer, a computer having a wireless transceiver function, a virtual reality (VR) terminal device, an augmented reality (AR) terminal device, a wireless terminal device in industrial control, a wireless terminal device in self-driving, a wireless terminal device in telemedicine, a wireless terminal device in a smart grid, a wireless terminal device in transportation safety, a wireless terminal device in a smart city, a wireless terminal device in a smart home, or the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a future 5$^{th}$ generation (5G) network, a terminal device in a future evolved public land mobile network (PLMN), or the like. The terminal device sometimes may also be referred to as user equipment (UE), an access terminal device, a vehicle-mounted terminal device, a terminal device in industrial control, a UE unit, a UE station, a mobile station, a remote station, a remote terminal device, a mobile device, a wireless communication device, a UE agent, a UE apparatus, or the like. The terminal device may alternatively be fixed or mobile. This is not limited in embodiments of this application.

II. TSN System

For application of a 3$^{rd}$ generation partnership project (3GPP) network in an industrial control system, an IIoT feature is introduced in 5G R16. Via a 5G communication system, various functional nodes in the industrial control system are connected, including an industrial controller that sends a control command, an industrial terminal, for example, an operation arm, that receives and executes the control command, a configuration unit that configures the nodes such as the controller and the operation arm, and the like. The 5G system provides flexible routing, allowing various industrial controllers and industrial terminals to be quickly organized into different production lines. This achieves flexible deployment and adapts to small-batch and diversified production requirements.

Most control data packets in data packets in the industrial control system, excluding log data packets, requires real-time performance and deterministic performance. The real-time performance may also be referred to as an ultra-short delay. The real-time performance is a requirement on a transmission delay of a data packet, to be specific, the transmission delay of the data packet is required to be not greater than T_delay. Deterministic performance is a requirement on jitter of a transmission delay of a data packet, to be specific, the transmission delay of the data packet is required to be equal to T_delay. To meet the requirement of the deterministic performance, a buffer needs to be added to a receiver. If receiving time is earlier than expected time, the data packet is first buffered and then delivered. To meet the requirement of the real-time performance, a wireless network requires more radio resources and a more robust modulation and demodulation mode for transmission, or a specially designed scheduling mode, for example, an uplink scheduling-free mode, to reduce the transmission delay.

3. DN

The DN is a serving network that provides data services for users. For example, the DN may be an IP multi-media service network or the internet. A terminal device may establish a protocol data unit (PDU) session from the terminal device to the DN, to access the DN.

Refer to FIG. 1. A part in a thick-line box in the middle of FIG. 1 belongs to a communication system, and a part outside the thick-line box in FIG. 1 belongs to an industrial control system. The communication system is connected to the industrial control system through two interfaces. The two interfaces may be a destination-side TSN translator (DS-TT) on a terminal device side and a network-side TSN translator (NW-TT) on a UPF side respectively. The two interfaces collaborate to calculate a transmission delay that IIoT control information passes through a 5G communication system, in other words, a delay that the IIoT control information passes through the two interfaces. During actual deployment, both a UPF and the UE maintain a same clock, which is referred to as a 5G clock. At the same time, a 5G clock on the UPF side is synchronized with a 5G clock on the UE side. Therefore, when IIoT control information passes through the NW-TT on the UPF side, the UPF records time corresponding to this moment. When the IIoT control information passes through a 5G network and arrives at the DS-TT on the UE side, the UE records time corresponding to this moment. A transmission delay that the IIoT control information passes through the 5G network may be calculated based on time information recorded by the UPF and the UE.

In the industrial control system, devices collaborate with each other, and control of the devices needs to be performed based on a common clock, namely, a time-sensitive network (TSN) clock. The precision of the TSN clock is related to a specific requirement of the industrial control system. Each specific production line may use an individual TSN clock, and different production lines may use TSN clocks independent of each other. FIG. 1 is used as an example. If different production lines transmit control information via the 5G network, control information of the production lines may be based on different TSN clocks. The 5G network transparently transmits the control information, but needs to measure transmission delays that the control information passes through the 5G network. In this way, a receiver of the industrial control information calculates the transmission delay of the 5G network, to accurately manage execution time of each piece of information. The foregoing description uses the 5G network as an example, but is not intended to limit embodiments of this application. For example, in embodiments of this application, a 4G or future 6G communication system may be used for transmission of data information and/or control information of the industrial control system.

Figure 3:
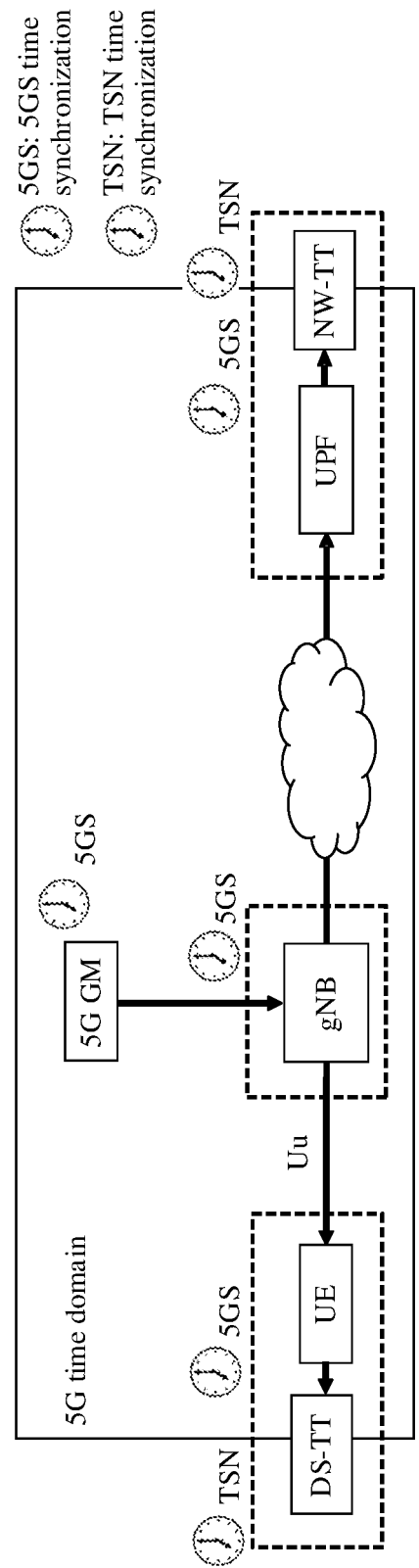
FIG. 3 is a schematic diagram of a 5G clock and a TSN clock according to at least one embodiment of this application.

FIG. 3 shows a clock synchronization system in which a 5G network is applied to industrial control. The middle part in FIG. 3 belongs to the 5G network, and network elements such as a UPF, a gNB, and UE in the 5G network all maintain a common clock, namely, a 5G clock. The 5G clock of each 5G network element in FIG. 3 is from a same grand master clock "5G grand master clock (5G GM)". The 5G GM may be a global positioning system (GPS) module to maintain GPS time, or a high-precision clock of another type. This is not limited. In addition, both an NW-TT on a UPF side and a DS-TT on a UE side maintain a common TSN clock. Because the UPF and NW-TT belong to a same physical entity, and the NW-TT is an interface module embedded in the UPF, it can be considered that the UPF or the NW-TT simultaneously maintains two clocks: a 5G clock and a TSN clock. A case on the UE side is similar. It may be considered that the UE or the DS-TT simultaneously maintains two clocks: a 5G clock and a TSN clock. If a 5G system simultaneously transmits control information of a plurality of production lines respectively using TSN clocks: TSN1, TSN2, . . . , the UPF and the UE simultaneously maintain a 5G clock and a plurality of TSN clocks. Optionally, quantities of TSN clocks maintained by the UE and the UPF are usually different. Further, a quantity of industrial terminals maintained by the UE is usually related to a quantity of production lines.

Based on the clock synchronization system in FIG. 3, when an industrial control data packet enters the 5G system through the NW-TT, the NW-TT may add a timestamp to the data packet, to indicate a moment at which the data packet passes through the NW-TT. The timestamp is represented by 5G time, for example, 15:32:45:438, where the timestamp is in the format of hour:minute:second:millisecond. When the data packet passes through the 5G system and arrives at the UE, the DS-TT on the UE side reads the 5G clock maintained by the UE, for example, 15:32:45:458. In this case, it is considered that a delay that the data packet passes through the 5G system is 20 ms. Usually, the industrial control data packet may further include execution time of the data packet. The execution time is based on the TSN clock and is invisible to the 5G system.

Network architectures and service scenarios described in FIG. 1, FIG. 2, and FIG. 3 are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

Unless otherwise specified, "/" in the descriptions of this application represents an "or" relationship between associated objects. For example, A/B may represent A or B. In this application, "and/or" describes only an association relationship for describing associated objects and represents that three relationships may exist. For example, A and/or B may represent the following three cases: Only A exists, both A and B exist, and only B exists. A and B may be singular or plural. In addition, unless otherwise specified, "a plurality of" in the descriptions of this application means two or more than two. "At least one item (piece) of the following" or a similar expression thereof means any combination of the items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, for convenience of clear description of the technical solutions in embodiments of this application, in embodiments of this application, terms such as "first" and "second" are used to distinguish between same objects or similar objects whose functions and purposes are basically the same. A person skilled in the art may understand that the terms such as "first" and "second" do not constitute a limitation on a quantity or an execution sequence, and that the terms such as "first" and "second" do not indicate a definite difference.

Network elements in embodiments of this application include an access network device, a terminal device, a core network element, an industrial controller, and the like. The access network device may be of a CU/DU architecture. In this case, the access network device includes two network elements: a CU and a DU. Alternatively, the access network device may be of a CP-UP architecture. In this case, the access network device includes three network elements: a CU-CP, a CU-UP, and a DU. Alternatively, the access network device may be of an open radio access network (ORAN) architecture. In this case, the access network device includes four network elements: a CU-CP, a CU-UP, a DU, and a near real-time access network intelligent controller (RAN intelligent controller, RIC), or includes more network elements. Further, the DU may be split into a DU-H, a DU-L, and the like, to support split of a lower layer, for example, a far-end physical layer. The core network element may be responsible for admission, session management, and the like. The industrial controller may be responsible for generating industrial control data, maintaining the TSN clock, and the like.

Embodiment 1

Embodiment 1 of this application provides a communication method. The method includes: A first communication apparatus receives a plurality of data packets from a second communication apparatus. The first communication apparatus reports the plurality of data packets to a third communication apparatus after an end moment of a first time period.

In a possible implementation, a terminal device (for example, UE) is connected to an industrial terminal. The industrial terminal may include a sensor, a mechanical arm, and the like. A core network element (for example, a UPF network element) is connected to an industrial controller. The terminal device receives reported data packets sent by the industrial terminal, and centrally transmits the reported data packets to the core network element. Then, the reported data packets are transmitted to the industrial controller. In this case, the first communication apparatus may be the terminal device, the second communication apparatus may be the industrial terminal or a communication device connected to the industrial terminal, and the third communication apparatus may be an access network device. In the following description, the "industrial terminal" and the "communication device connected to the industrial terminal" are used interchangeably. In the following, the "industrial terminal" is used as an example for description.

In another possible implementation, a terminal device is connected to an industrial controller, a core network element is connected to an industrial terminal, and the core network element receives data sent by the industrial terminal, and centrally transmits the data to the terminal device. In this case, the first communication apparatus may be the core network element, the second communication apparatus may be the industrial terminal, and the third communication apparatus may be an access network device, and the like. It may be understood that the foregoing communication apparatus may be the industrial terminal, the terminal device, the access network device, the core network element, or the like; or may be a component in the industrial terminal, the terminal device, the access network device, or the core network element, for example, a chip, a circuit, or another component. This is not limited.

Figure 4:
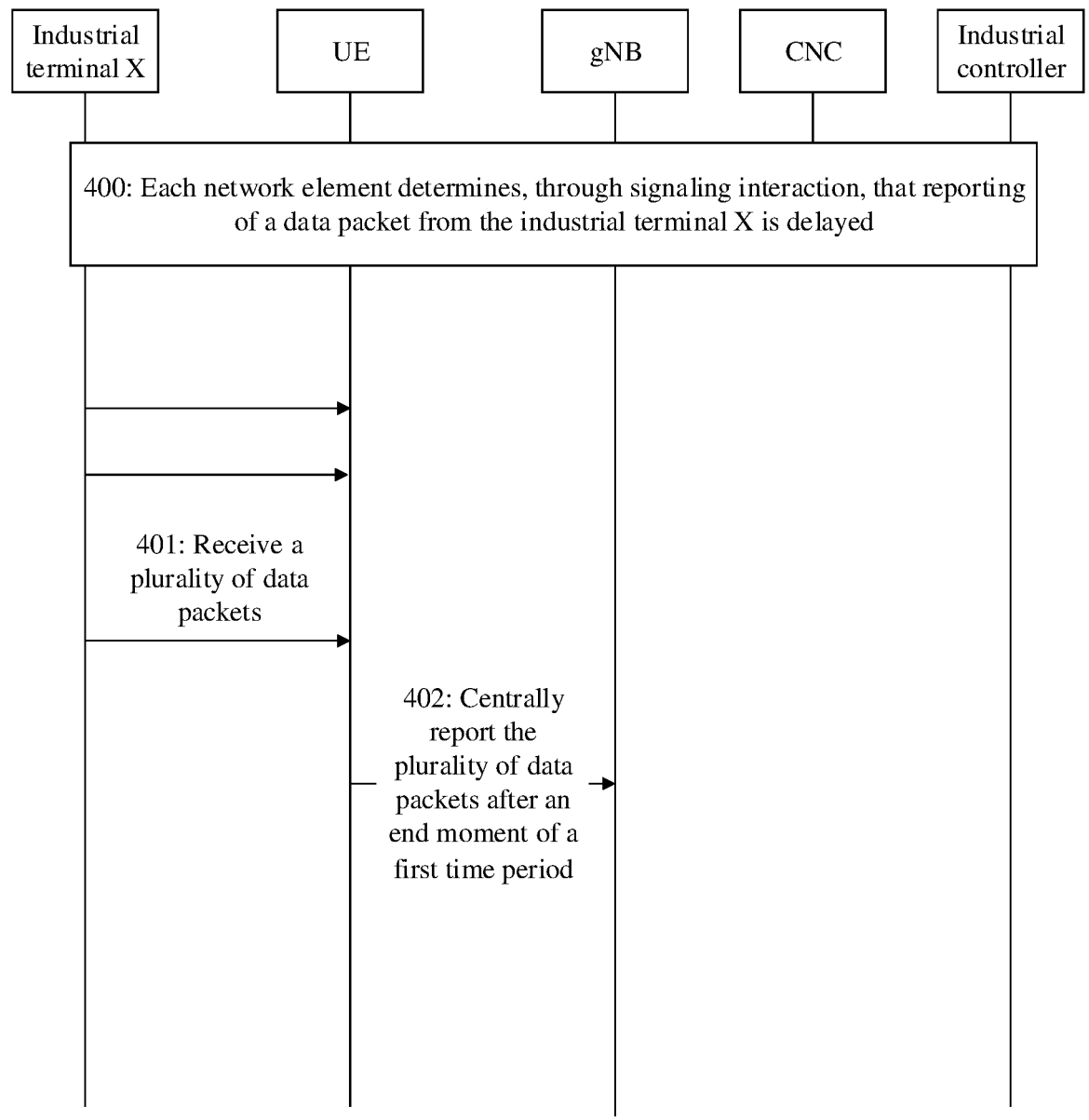
FIG. 4 is a schematic flowchart of a communication method according to Embodiment 1 of this application.

As shown in FIG. 4, a procedure of a communication method is provided. The procedure is described by using an example in which a first communication apparatus is UE, a second communication apparatus is an industrial terminal X, and a third communication apparatus is a gNB. The procedure includes but is not limited to the following:

Optionally, S400: The industrial terminal, the UE, the gNB, a UPF, a computer numerical controller (CNC), an industrial controller, or the like determines, through signaling interaction, that reporting of a data packet from the industrial terminal X is delayed. The delayed reporting means that the UE centrally reports, to the gNB, a plurality of data packets that are reported by the industrial terminal X to the UE in a plurality of periods.

S401: The UE receives the plurality of data packets from the industrial terminal X. The plurality of data packets of the industrial terminal X are data packets in a plurality of periods, and a length of the periods of the plurality of data packets is less than a maximum delay of a first service. For example, the periodicity herein may be a periodicity in which the industrial terminal X reports a data packet to the UE.

Optionally, the UE may determine, based on one or more of information such as a DS-TT port number of the data packet, a MAC address of the industrial terminal, a type identifier (TYPE ID) in the data packet, and a destination MAC address in the data packet, that the data packet is a data packet reported by the industrial terminal X. According to the conclusion in S400, it is identified that the data packet is delayed to be reported.

S402: The UE centrally reports the plurality of data packets to the gNB after an end moment of a first time period. A length of the first time period is not greater than the maximum delay of the first service.

Implementation A: The UE manages, by using a timer, the plurality of centrally reported data packets. For example, the first time period is equal to duration of the timer, and the end moment of the first time period is a timeout moment of the timer.

The UE receives a first data packet from the industrial terminal X, and starts the timer, where the first data packet is the $1^{st}$ data packet in the plurality of data packets. During running of the timer, the UE receives another data packet from the industrial terminal X, where the another data packet is a data packet other than the first data packet in the plurality of data packets. After the timer expires, the UE centrally reports the plurality of data packets to the gNB.

In a specific implementation, each time the UE receives a data packet from the industrial terminal X, the UE determines whether the timer is started. If the timer has not been started or has expired, the UE starts the timer, and stores the data packet reported by the industrial terminal X. Subsequently, each time the UE receives the data packet reported by the industrial terminal X, if the timer does not expire, the UE stores received reported data packets, for example, stores the received reported data packets in a receiving sequence. If the timer expires, the UE centrally transmits all stored data packets that have not been reported. The centrally transmitted packets are eventually transmitted to the industrial controller and the like through the gNB and the UPF. For example, if a reporting periodicity of the industrial terminal X is 4 ms, and the maximum delay is 200 ms, the duration of the timer only needs to be less than or equal to 200 ms.

Implementation B: The UE manages, by using a counter, the plurality of centrally reported data packets. For example, the end moment of the first time period is equal to a moment at which a count value of the counter reaches a threshold or a threshold value. The threshold or the threshold value is determined based on the length of the periods of the data packets and the maximum delay of the first service. For example, if a reporting periodicity of the industrial terminal X is 5 ms, and the maximum delay is 200 ms, the threshold or the threshold value of the counter may be set to 40 or a value less than 40. The threshold and the threshold value are used interchangeably. The following description uses the threshold value as an example.

After receiving a first data packet from the industrial terminal X, the UE starts the counter, where the first data packet is the $1^{st}$ data packet in the plurality of data packets. Subsequently, each time the UE receives a data packet from the industrial terminal X, the value of the counter is increased by 1. When the count value of the counter reaches the threshold or the threshold value, the UE reports the plurality of data packets to the gNB.

In a specific implementation, each time the UE receives a data packet from the industrial terminal X, the UE determines whether the counter is started. If the counter has not been started or has expired, the UE starts the counter, and stores the data packet reported by the industrial terminal X. That the counter expires refers to a state in which the count value of the counter is greater than the threshold or the threshold value. Subsequently, each time the UE receives the data packet reported by the industrial terminal X, if the count value of the counter does not reach the threshold value, the UE stores received reported data packets in a receiving sequence. If the count value reaches the threshold value, the UE centrally transmits all stored data packets that have not been reported. The centrally transmitted data packets are eventually transmitted to the industrial controller through the gNB and the UPF. After receiving the plurality of reported data packets at a time, the industrial controller records the receiving of the plurality of reported data packets in a log file of the industrial controller or performs other handling.

Optionally, because each reported data packet carries time information, the UE may perform packet assembly based on the time information carried in the data packet; the UE may perform packet assembly on the reported data packets in a positive sequence or a reverse sequence of receiving; or the like. This is not limited. A specific manner of packet assembly used by the UE may be determined by the industrial controller, or may be determined by the industrial controller and another network element through interaction. In addition, the manner is used as one of configuration parameters in S400 to be notified to the UE.

Optionally, in S400, parameters determined by the network elements such as the industrial terminal, the UE, and the gNB through signaling interaction may include one or more of the following parameters: timer duration for centralized reporting, a counter threshold value, whether the UE performs packet assembly on reported data packets in a positive sequence or a reverse sequence of receiving, a corresponding MAC address of the industrial terminal, a UE-side DS-TT port number corresponding to the industrial terminal, a destination MAC address carried in the data packet, a UPF-side NW-TT port number, and the like. Specifically, the following several implementations are included.

Implementation A: The industrial terminal interacts with the industrial controller to determine the timer duration for centralized reporting, the counter threshold value, or the like. The industrial terminal notifies the UE of the timer duration or the counter threshold value. Optionally, the industrial terminal may further notify the UE of the "corresponding MAC address of the industrial terminal", the "UE-side DS-TT port number corresponding to the industrial terminal", the "destination MAC address carried in the data packet", the "UPF-side NW-TT port number", and the like.

Implementation B1: The industrial terminal interacts with the industrial controller to determine the timer duration for centralized reporting or the counter threshold value, and the industrial controller notifies the UE. Specifically, the industrial controller notifies the UE of the two parameters through TSN AF→PCF→SMF→AMF→UE. Optionally, the industrial controller may further notify the UE of the "corresponding MAC address of the industrial terminal", the "UE-side DS-TT port number corresponding to the industrial terminal", the "destination MAC address carried in the data packet", the "UPF-side NW-TT port number", and the like. The AMF may notify the UE via a non-access stratum (NAS) message. In an entire notification process, each network element may transparently transmit the foregoing parameters, or may transmit the parameters after reading the parameters. This is not limited.

Implementation B2: The industrial terminal interacts with the industrial controller to determine the timer duration for centralized reporting or the counter threshold value, and the industrial controller notifies the UE. Specifically, the industrial controller notifies the UE of the two parameters through TSN AF→PCF→SMF→AMF→RAN→UE. Optionally, the industrial controller may further notify the UE of the "corresponding MAC address of the industrial terminal", the "UE-side DS-TT port number corresponding to the industrial terminal", the "MAC address carried in the data packet", the "UE-side DS-TT port number corresponding to the industrial terminal", and the like. A difference from Implementation B1 lies in that, in Implementation B2, the RAN, namely, a base station, notifies the UE via a radio resource control (RRC) message. In an entire notification process, each network element, other than the base station, may transparently transmit the foregoing parameters, or may transmit the parameters after reading the parameters. This is not limited in this embodiment.

Implementation C: The industrial controller independently determines, based on the reporting periodicity of the industrial terminal and the maximum transmission delay, the timer duration for centralized reporting, the counter threshold value, or the like, without interacting with the industrial terminal. The industrial controller notifies the UE of the determined parameter. A notification manner may be the same as that in the foregoing Implementation B1 or B2.

Implementation D: The industrial controller interacts with one or more network elements in a communication system (for example, a 5G system) to determine the timer duration for centralized reporting, the counter threshold value, or the like. The network element in the communication system (for example, the 5G system) notifies the UE. The network element, in the communication system, that participates in an interaction process may include but is not limited to a TSN AF, a PCF, an SMF, an AMF, a base station, or the like. For a manner in which the network element notifies the UE, refer to the record in Implementation B1 or B2.

Implementation E: A network element in a communication system (for example, a 5G system) independently determines, based on the reporting periodicity and a maximum delay requirement, the timer duration for centralized reporting or the counter threshold value, and notifies the UE. Specifically, the SMF may determine at least one of the following parameters: the timer duration for centralized reporting, the counter threshold value, whether to perform packet assembly on the reported data packets in a positive sequence or a reverse sequence of receiving, the corresponding MAC address of the industrial terminal, the UE-side DS-TT port number corresponding to the industrial terminal, the destination MAC address carried in the data packet, and the UPF-side NW-TT port number. After determining the parameters, the SMF notifies a base station and the UE through SMF→AMF→gNB→UE, and notifies a UPF through SMF→UPF.

In the procedure in FIG. 4, the industrial terminal is used as an example for description. In a specific implementation process, actions of generating and reporting data are not limited to be performed by the industrial terminal. The foregoing solution can be used to optimize transmission for a service that meets the following two conditions: the service is periodically uploaded, and a maximum data transmission delay is required to be greater than a length of uploading periods. Data of a service that is periodically uploaded and whose maximum data transmission delay is required to be greater than a length of uploading periods is centrally transmitted. This improves transmission efficiency and reduces scheduling complexity.

Embodiment 2

Embodiment 2 of this application provides a communication method. The method includes: A first communication apparatus receives a third data packet from a second communication apparatus. The first communication apparatus deletes time information in the third data packet, to obtain a fourth data packet, where the fourth data packet is a data packet whose time information is deleted. The first communication apparatus sends the fourth data packet to a third communication apparatus. After receiving the fourth data packet, the third communication apparatus performs an operation of adding or supplementing time information. In descriptions of this application, addition and supplement are used interchangeably. Because time information is not transmitted through a wireless interface, a data transmission amount of a wireless communication system, especially the wireless interface, is reduced.

In a possible implementation, the method may be applied to uplink data transmission. A terminal device deletes time information in a data packet, and an access network device, a core network element, an industrial controller, or the like performs an operation of supplementing time information. The first communication apparatus may be an industrial device, the second communication apparatus may be the terminal device, and the third communication apparatus may be the access network device, the core network element, the industrial controller, or the like.

In another possible implementation, the method may be applied to downlink data transmission. A core network element or an access network device deletes time information, and a terminal device or an industrial terminal supplements time information. The first communication apparatus may be the core network element or the access network device, the second communication apparatus may be the core network element, and the third communication apparatus may be the terminal device, the industrial terminal, or the like.

Optionally, the method in which the first communication apparatus deletes time information in the third data packet, to obtain a fourth data packet may include: The first communication apparatus obtains a parameter of the third data packet, and when the parameter meets a preset condition, deletes the time information at a first location in the third data packet, to obtain the fourth data packet, where the first location is pre-configured, and is described in detail in Embodiment 2. Alternatively, the first communication apparatus may determine, by using an artificial intelligence (AI) learning algorithm, that the third data packet includes to-be-deleted time information. The first communication apparatus determines a first location of the time information in the third data packet by using the AI algorithm. The first communication apparatus deletes the time information at the first location in the third data packet, to obtain the fourth data packet. Detailed descriptions are provided in the following Embodiment 3. Further, the fourth data packet may carry first indication information, and the first indication information indicates that the time information has been deleted from the fourth data packet.

Figure 5:
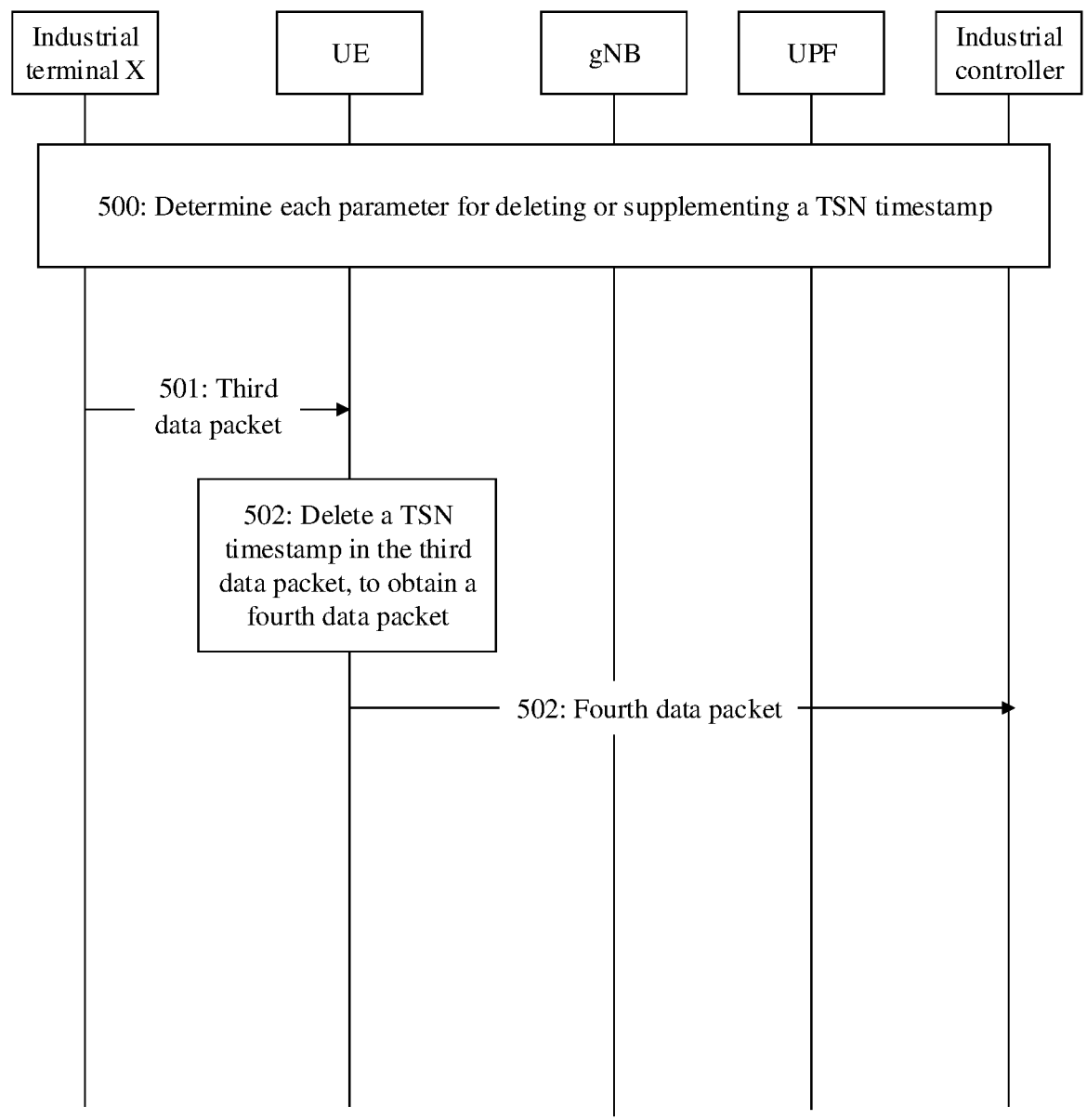
FIG. 5 is a schematic flowchart of a communication method according to Embodiment 2 of this application.

As shown in FIG. 5, a procedure of a communication method is provided. In the procedure, descriptions are provided by using an example in which a first communication apparatus is an industrial terminal X, a second communication apparatus is UE and performs an operation of deleting time information, and a third communication apparatus is a gNB, a UPF, or an industrial controller and performs an operation of supplementing time information, where the time information is a TSN timestamp.

Optionally, S500: The industrial terminal X, the UE, an SMF, the UPF, the industrial controller, and the like interact with each other, to determine one or more of the following parameters:
to delete a TSN timestamp included in a data packet that is from the industrial terminal X and then transmit the data packet; to delete a TSN timestamp for a data packet whose source port number is A; to delete a TSN timestamp for a data packet whose destination port number is B; to delete a TSN timestamp for a data packet whose source MAC address is C; to delete a TSN timestamp for a data packet whose destination MAC address is D; to delete a TSN timestamp for a packet with TYPE ID=E; a network element that deletes a TSN timestamp; bit locations corresponding to a TSN timestamp that needs to be deleted in a data packet; a bit location of indication information indicating that a TSN timestamp needs to be deleted; a network element that supplements a TSN timestamp; a transmission delay value used when a TSN timestamp is supplemented; and the like.

S501: The UE receives a third data packet from the industrial terminal X.

S502: The UE deletes a TSN timestamp in the third data packet, to obtain a fourth data packet, where the fourth data packet is a data packet whose TSN timestamp is deleted. The UE reports the fourth data packet to a network device. The network device may be the gNB, the UPF, or the like.

For example, the UE may obtain a parameter of the third data packet. The parameter includes but is not limited to one or more of information such as a DS-TT port number, a MAC address of the industrial terminal included in the third data packet, or a TYPE ID included in the third data packet. When the parameter meets a preset condition, the TSN timestamp is deleted at a first location in the third data packet, to obtain the fourth data packet, where the first location may be pre-configured.

In a specific implementation, after receiving the third data packet from the industrial terminal X, the UE identifies, based on one or more of information such as the DS-TT port number, the MAC address included in the third data packet, and/or the TYPE ID included in the third data packet, that the third data packet includes the TSN timestamp. The TSN timestamp is deleted based on the bit location that is of the TSN timestamp in the data packet and that is obtained in S500.

Optionally, for ease of distinguishing between a "data packet whose TSN timestamp has been deleted" and a "data packet whose TSN timestamp is not deleted", the fourth data packet whose TSN timestamp is deleted may be transmitted by using a pre-determined data radio bearer (DRB) or data flow. Alternatively, the foregoing two types of data packets may be transmitted by using a same DRB or flow. However, first indication information may be added to the fourth data packet whose TSN timestamp is deleted, and the first indication information may indicate that the TSN timestamp has been deleted from the fourth data packet. A receiver may determine, based on the first indication information, whether to perform an operation of supplementing TSN timestamp.

S503: After receiving the fourth data packet from the UE, the network device adds a TSN timestamp to the fourth data packet.

In this embodiment of this application, the network device may identify, based on the DRB or the flow in which the fourth data packet is located, or the first indication information in the fourth data packet, that the TSN timestamp has been deleted from the fourth data packet, supplement a TSN timestamp, and transmit the fourth data packet to the industrial controller. Due to factors such as time drift, the supplemented TSN timestamp may be different from the original TSN timestamp. Therefore, the solution in Embodiment 2 is more applicable to data that does not require high precision on the TSN timestamp, for example, a report log and a control message that does not require high-precision time. In S503, the TSN timestamp may be specifically added in the following implementations.

Implementation A: The gNB adds a TSN timestamp.

For example, in S503, after receiving the fourth data packet from the UE, the gNB may obtain a parameter of the fourth data packet. Optionally, the parameter of the fourth data packet includes but is not limited to the DRB or the flow for transmitting the fourth data packet. When the parameter meets a preset condition, the TSN timestamp is added at a first location in the fourth data packet.

In a specific implementation, the gNB may identify, based on the DRB or the flow for transmitting the fourth data packet, that the TSN timestamp has been deleted from the fourth data packet. A TSN timestamp obtained through calculation is added at the bit location determined in S500, and the fourth data packet is transmitted to the UPF and further transmitted to the industrial controller. Alternatively, the gNB may read values at some specific bit locations in the fourth data packet, and determine, based on the value of the specific bit location, a location for supplementing the TSN timestamp. Alternatively, after receiving the fourth data packet from the UE, the gNB may determine whether the fourth data packet includes the first indication information indicating that the TSN timestamp has been deleted. If the fourth data packet includes the first indication information, the TSN timestamp obtained through calculation is added to the fourth data packet at the bit location determined in S500, and the fourth data packet is transmitted to the UPF and further transmitted to the industrial controller.

With reference to the TSN synchronization time architecture shown in FIG. 2, the gNB maintains only a 5G clock and does not maintain a TSN clock. The UPF maintains both the 5G clock and the TSN clock. The industrial controller maintains only the TSN clock and does not maintain the 5G clock. Therefore, the gNB supplements the TSN timestamp in three manners. First, the gNB generates a TSN timestamp based on the 5G clock, and adds the TSN timestamp to the fourth data packet. The fourth data packet is transmitted to the UPF. The UPF converts the TSN timestamp into a TSN timestamp that is based on the TSN clock. Second, the industrial controller periodically synchronizes the 5G clock with a 5G network element such as the UPF, to obtain and maintain the 5G clock. The gNB generates a TSN timestamp based on the 5G clock, and adds the TSN timestamp to the fourth data packet. The fourth data packet is transmitted to the industrial controller through the UPF. The industrial controller converts the TSN timestamp into a TSN timestamp that is based on the TSN clock. Third, the gNB periodically synchronizes the TSN clock with the UPF, to obtain and maintain the TSN clock. After the gNB receives the fourth data packet, the gNB generates a TSN timestamp based on the TSN clock, and adds the timestamp to the fourth data packet.

Implementation B: The UPF adds a TSN timestamp.

For example, in S503, the gNB receives the fourth data packet from the UE, and transmits the fourth data packet to the UPF. After receiving the fourth data packet from the gNB, if determining, based on a parameter of the fourth data packet, for example, the DRB or the flow for transmitting the fourth data packet, or the first indication information carried in the fourth data packet, that the TSN timestamp has been deleted from the fourth data packet, the UPF supplements the TSN timestamp based on a TSN clock maintained by the UPF, and transmits the fourth data packet to the industrial controller.

Optionally, in addition to being added by the network device such as the gNB or the UPF, the TSN timestamp may alternatively be added by the industrial controller. For example, the gNB receives the fourth data packet from the UE, and the fourth data packet is transmitted to the industrial controller through the UPF. If the industrial controller identifies, based on the parameter of the fourth data packet or the first indication information included in the fourth data packet, that the TSN timestamp is deleted from the fourth data packet, the industrial controller supplements the TSN timestamp, and then performs further processing. Optionally, the parameter of the fourth data packet includes one or more of information such as a source port number, a destination port number, a source MAC address, a destination MAC address, or a TYPE ID.

It should be noted that a specific used implementation of the foregoing three implementations may be determined through negotiation in S500, and a corresponding network element is notified to perform an operation of adding a TSN timestamp.

Optionally, a device that adds a TSN timestamp, for example, the gNB, the UPF, or the industrial controller, may determine the TSN timestamp based on a sending periodicity of a data packet. For example, the gNB, the UPF, the industrial controller, or the like may obtain, by using a pre-configured procedure, a traffic pattern of a data packet sent by the industrial terminal, where the traffic pattern specifically includes: a TSN timestamp X corresponding to the $1^{st}$ data packet, and a periodicity K. In this case, the gNB, the UPF, the industrial control, or the like may calculate, based on the traffic pattern, that a TSN timestamp corresponding to the $2^{nd}$ data packet is X+K, a TSN timestamp corresponding to the $3^{rd}$ data packet is X+2K, and the like. The rest may be deduced by analogy, and details are not described again. Alternatively, the UPF, the gNB, the industrial controller, or the like may obtain, by using a pre-configured procedure, a periodicity for the industrial terminal to send a data packet. When the industrial terminal sends the $1^{st}$ data packet, the UE may not delete a TSN timestamp of the data packet. Starting from the $2^{nd}$ data packet, the UE deletes a TSN timestamp of the data packet. In this way, the UPF, the gNB, or the industrial controller can deduce a TSN timestamp of each subsequent data packet based on the TSN timestamp of the $1^{st}$ data packet and the periodicity. In this manner of supplementing a timestamp, the UE is required to perform packet assembly in a sequence of receiving the data packets, and centrally transmit the data packets to the gNB. The UPF, the gNB, the industrial controller, or the like does not need to determine a timestamp based on a clock of the UPF, the gNB, the industrial controller, or the like, but only need to perform deduction based on the sequence of the data packets. It may be understood that, in the foregoing example, an example in which the $1^{st}$ data packet carries the TSN timestamp is used for description. During actual deployment, to prevent a transmission failure of the $1^{st}$ data packet, the first N data packets may each carry a TSN timestamp, and starting from the $(N+1)^{th}$ data packet, a TSN timestamp is no longer carried.

Alternatively, the device that performs the operation of adding the TSN timestamp may determine a TSN timestamp and the like based on receiving time and a transmission delay of a data packet. The IIoT uses deterministic transmission, and a delay experienced by each hop may be pre-determined or determined by a network management platform. Therefore, the network element that adds the TSN timestamp may deduce, based on a moment at which the network element receives the data packet and with reference to a delay of the data packet from a source to the network element, a value of the supplemented TSN timestamp. For example, the UPF supplements the TSN timestamp, the UPF receives the fourth data packet at TSN time "11:38:34:345", and learns in advance that the transmission delay from the source to the UPF is fixed to 20 ms, and the UPF deduces that the fourth data packet is sent from the source at TSN time "11:38:34:325", and therefore, the TSN timestamp "11:38:34:325" is supplemented for the fourth data packet.

The foregoing embodiment focuses on descriptions of parameters related to TSN timestamp deletion or supplementation, but details of a parameter transmission procedure are not described. The following describes in detail four implementations of parameter transmission.

Parameter transmission manner A: The industrial terminal X interacts with the industrial controller to determine a parameter and a network element that performs an operation of deleting or supplementing a TSN timestamp. The industrial terminal X notifies the UE, and the industrial controller notifies a network-side network element, for example, the UPF or the gNB. The industrial controller notifies the base station through TSN AF-PCF-SMF-AMF-gNB, and the industrial controller notifies the UPF through TSN AF-PCF-SMF-UPF.

Parameter transmission manner B1: The industrial terminal X interacts with the industrial controller to determine a parameter. The industrial controller notifies all network elements, including the network element UE that deletes a TSN timestamp and the network element gNB or UPF that supplements a TSN timestamp. Specifically, the industrial controller notifies the UE through TSN AF→PCF→SMF→AMF→UE. The AMF notifies the UE via a NAS message, and the industrial controller notifies the UPF through TSN AF→PCF→SMF→UPF. In an entire notification process, each network element may transparently transmit the parameter, or may transmit the parameter after reading the parameter. This is not limited.

Parameter transmission manner B2: The industrial terminal X interacts with the industrial controller to determine a parameter. The industrial controller notifies all network elements, including the network element UE that deletes a TSN timestamp and the network element gNB or UPF that supplements a TSN timestamp. Specifically, the parameter is notified to the UE through TSN AF→PCF→SMF→AMF→RAN→UE. A difference from Implementation B1 lies in that, the base station, namely, the RAN, in Implementation B2, notifies the UE via an RRC message. A path through which the industrial controller notifies the UPF is the same as that in Implementation B 1. In an entire notification process, each network element, other than the base station, may transparently transmit the parameter, or may transmit the parameter after reading the parameter. This is not limited.

Parameter transmission manner C: The industrial control network element provides a service feature and a location of a TSN timestamp in a data packet, and a 5G network element independently determines who performs the behavior of deleting the TSN timestamp and who performs the behavior of supplementing a TSN timestamp. Specifically, a central network control (CNN) network element provides information: uplink/downlink data, a data packet that only needs to meet one or more conditions of "source port number=A, destination port number=B, source MAC address=C, destination MAC address=D, and TYPE ID in the data packet=E", where some bit locations in the data packet are TSN timestamps. A PCF or an SMF in a 5G network determines a network element that deletes a TSN timestamp or supplements a TSN timestamp. For example, the UE deletes a TSN timestamp, and the gNB or the UPF supplements a TSN timestamp. It should be noted that, when this parameter transmission manner is used, an implementation of S503 can correspond only to Implementation A in which "the TSN timestamp is supplemented by the gNB" in, or Implementation B in which "the TSN timestamp is supplemented by the UPF", and cannot correspond to Implementation C in which "the TSN timestamp is supplemented by the industrial controller". A specific parameter transmission path is the same as that in the foregoing Manner B, and is not described again.

Parameter transmission manner D: The industrial control network element provides a service feature and a location of a TSN timestamp in a data packet, and the industrial control network element supplements a TSN timestamp. A 5G network element independently determines a specific network element that deletes a TSN timestamp. Specifically, the industrial control network element CNC provides information: uplink/downlink data, a data packet that only needs to meet one or more conditions of "source port number=A, destination port number=B, source MAC address=C, destination MAC address=D, and TYPE ID in the data packet=E", where some bit locations in the data packet are TSN timestamps. In addition, the CNC further provides information: a network element selected by a 5G network to delete a TSN timestamp, and the industrial controller supplements a TSN timestamp. A PCF or an SMF in the 5G network may determine that the UE deletes a TSN timestamp. A specific parameter transmission path is the same as that in the foregoing Manner B, and is not described again.

When industrial control data or industrial log data is transmitted by using FIG. 5, for uplink data, the UE deletes a TSN timestamp in a data packet, and the base station/UPF/industrial controller supplements a TSN timestamp. For downlink data, the UPF/base station deletes a TSN timestamp in a data packet, and the UE/industrial controller supplements a TSN timestamp. Because the TSN timestamp is not transmitted through a wireless interface, a data transmission amount of a wireless communication system, especially the wireless interface, is reduced. In another aspect, by centrally transmitting a plurality of pieces of industrial log data, overheads required for data transmission are reduced. For example, DCI required for allocating an uplink resource by the base station and padding added at a physical layer when the UE transmits a small amount of uplink data are reduced, and wireless transmission efficiency is improved.

Embodiment 3

A difference between Embodiment 3 and Embodiment 2 lies in that, a sender, namely, a first communication apparatus, determines, by using an AI algorithm, that a third data packet includes to-be-deleted time information. The first communication apparatus determines a first location of the time information in the third data packet by using the AI algorithm. The first communication apparatus deletes the time information at the first location in the third data packet, to generate a fourth data packet. Alternatively, a sender, namely, a first communication apparatus, determines, by using an AI algorithm, that a third data packet includes to-be-deleted time information and a first location of the time information in the third data packet. The first communication apparatus deletes the time information at the first location in the third data packet. The first communication apparatus sends a fourth data packet to a second communication apparatus, where the fourth data packet is a data packet whose time information is deleted. In addition, the first communication apparatus sends a notification message to the second communication apparatus served as a receiver, where the notification message is used to notify the second communication apparatus that the time information has been deleted from the fourth data packet and time information needs to be supplemented, and a location of the supplemented time information in the fourth data packet. The notification message may implicitly perform indication to the second communication apparatus, or may explicitly perform indication to the second communication apparatus. For example, in an example, the first communication apparatus may send the fourth data packet by using a specific DRB or flow. In this case, after receiving the fourth data packet by using the specific DRB or flow, the second communication apparatus may determine that the time information has been deleted from the fourth data packet and the time information needs to be supplemented. The location at which the second communication apparatus supplements the time information may be pre-configured, or notified by the sender to the first communication apparatus via the notification message, or the like. Details are not described again.

Certainly, in this embodiment of this application, a receiver, namely, a second communication apparatus, may alternatively determine, by using an AI algorithm, a third data packet including to-be-deleted time information and a location of the to-be-deleted time information in the third data packet, and then notify the sender, namely, the first communication apparatus. A process is similar to the foregoing, and is not described in detail.

Figure 6:
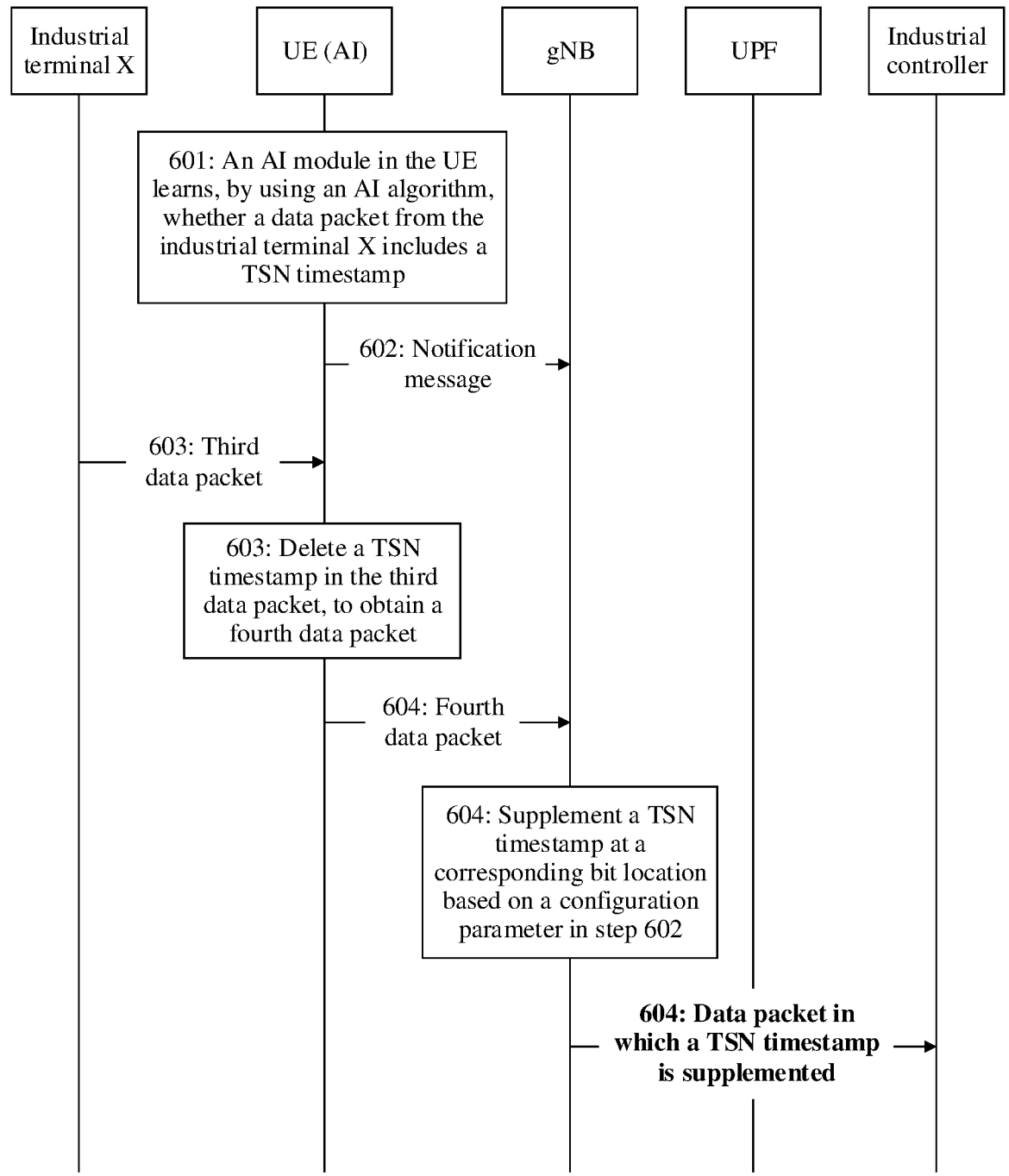
FIG. 6 is a schematic flowchart of a communication method according to Embodiment 3 of this application.

As shown in FIG. 6, descriptions are provided by using an example in which a first communication apparatus is UE, a second communication apparatus is an industrial terminal X, a third communication apparatus is a UPF or a gNB, time information is a TSN timestamp, and a sender performs prediction by using an AI algorithm. The method includes but is not limited to the following steps.

S601: An AI module in the UE learns, by using the AI algorithm, whether a data packet from the industrial terminal X includes the TSN timestamp.

In a possible implementation, the AI module in the UE learns that, it may be deduced that the data packet includes the TSN timestamp provided that the data packet from the industrial terminal X meets one or more of the following conditions. The conditions include but are not limited to: source port number=A, destination port number=B, MAC source address=C, MAC destination address=D, and TYPE ID in the data packet=E.

In another possible implementation, the AI module in the UE may obtain a large quantity of data packets, and pre-train a neural network based on a feature of the data packet, for example, a MAC source address, a MAC destination address, and/or a TYPE ID in the data packet. Then, each time a data packet from the industrial terminal X is obtained, whether the data packet can include a TSN timestamp may be determined by using the AI module. Optionally, the AI module may be a recurrent neural network (RNN), a convolutional neural network (CNN), or the like. Optionally, the AI module may be continuously updated as time elapses.

S602: The UE sends a notification message to the gNB. The notification message is used to notify the gNB to add a TSN timestamp after receiving a data packet transmitted by using a flow XX or a DRB XX. Optionally, the notification message may include one or more of the following configuration parameters: indication information indicating that the supplemented timestamp is a timestamp based on a 5G clock, or indication information indicating that the supplemented timestamp is a timestamp based on a TSN clock, a bit location of the supplemented timestamp in the original data packet, and the like. Optionally, the notification message may be transmitted via an RRC message, and the gNB receives a reply response message.

S603: The UE receives a third data packet from the industrial terminal X, determines, based on the content recorded in S600, whether the third data packet meets a condition for deleting a TSN timestamp. If the third data packet meets the condition for deleting the TSN timestamp, the UE deletes the TSN timestamp of the third data packet. Certainly, a location of the TSN timestamp in the third data packet may alternatively be obtained through learning and prediction by using the AI module in the UE. The third data packet whose TSN timestamp is deleted, that is, a fourth data packet, is sent to the gNB.

S604: After receiving the fourth data packet, the gNB supplements a TSN timestamp at a corresponding bit location based on the configuration parameter in S602, and transmits the fourth data packet to the UPF and an industrial controller.

Optionally, if the gNB supplements a timestamp that is based on the TSN clock, the UPF does not need to perform further processing after receiving the fourth data packet, and continues to transmit the fourth data packet to the industrial controller. If the gNB supplements a timestamp that is based on the 5G clock, the UPF needs to convert the timestamp into a timestamp that is based on the TSN clock. A conversion manner is the same as that in Embodiment 2, and details are not described herein again.

It should be noted that in the foregoing S604, an example in which the gNB supplements the TSN timestamp is used for description. Actually, the UPF network element may also supplement the TSN timestamp, and a specific procedure is as follows:

S601 is the same as the foregoing description, and a difference between S602 and the foregoing description lies in that, the UE sends a notification message to the UPF, to notify the UPF to supplement the TSN timestamp. A configuration parameter included in the notification message is the same as that described above. However, the UPF only needs to supplement the timestamp that is based on the TSN clock, and does not need to supplement the timestamp that is based on the 5G clock. A transmission path of the configuration parameter in the notification message is UE-gNB-AMF-SMF-UPF. The configuration parameter may be fed back hop by hop, or may be fed back together by a plurality of hops. An intermediate node may transparently transmit the configuration information, or may read the configuration information and then regenerate a message for next-hop transmission. Specifically, the UE and the gNB may transmit the RRC message (where the gNB can read message content), or may transparently transmit the NAS message (where the gNB does not read message content).

For uplink data, the AI module on a UE side learns a data feature and deletes a TSN timestamp, and the gNB, the UPF, or the industrial controller supplements a TSN timestamp. For downlink data, an AI module on a UPF or gNB side learns a data feature and deletes a TSN timestamp, and the UE or the industrial terminal supplements a TSN timestamp. If the AI module on the UPF side learns the feature of the downlink data and deletes the TSN timestamp, a configuration parameter determined by the UPF is transmitted to the UE through UPF-SMF-AMF-gNB-UE, to notify the UE to supplement the TSN timestamp. If the AI module on the gNB side learns the feature of the downlink data and deletes the TSN timestamp, a configuration parameter determined by the gNB is transmitted to the UE through gNB-UE.

In the procedure in FIG. 6, a data sender AI module learns and deletes a TSN timestamp, and a data receiver AI module supplements a TSN timestamp. During actual deployment, the data receiver AI module may learn, and then notify the sender. For example, the AI module in the UE learns the downlink data feature based on the received downlink data, and then the UE notifies the gNB or the UPF to delete a TSN timestamp and a location of the TSN timestamp in the data packet. When receiving the downlink data packet, the gNB or the UPF deletes the TSN timestamp. When receiving the downlink data, the UE supplements a TSN timestamp.

In this embodiment of this application, the AI module in the UE, the UPF, or the gNB learns the data feature, and triggers TSN timestamp deletion and supplementation. An amount of data transmitted in a 5G communication system, especially an amount of data transmitted over an air interface, can be reduced.

Embodiment 4

Embodiment 1 describes in detail a procedure in which a sender centrally transmits data packets. Embodiment 2 and Embodiment 3 describe in detail a procedure in which a sender deletes time information of a data packet and then transmits the data packet, and a receiver supplements time information of the data packet. For a periodic service, a data source sends one or more data packets at an interval of a periodicity, and the foregoing two technical features may be implemented in combination, which is specifically:

A first communication apparatus receives a plurality of data packets from a second communication apparatus, where the plurality of data packets are data packets of a first service, the plurality of data packets are data packets in a plurality of periods, and a length of the periods of the plurality of data packets is less than a maximum delay of the first service. Then, the first communication apparatus determines, in the plurality of data packets, a second data packet whose time information needs to be deleted. The first communication apparatus deletes the time information of the second data packet. The first communication apparatus reports the plurality of data packets to a third communication apparatus after an end moment of a first time period, where a length of the first time period is not greater than the maximum delay of the first service. After receiving the plurality of data packets, the third communication apparatus adds time information to the second data packet in the plurality of data packets.

For how to determine the second data packet that includes to-be-deleted time information in the plurality of data packets, refer to the following description. In a possible implementation, the first communication apparatus may determine the second data packet based on parameters of the plurality of data packets. The parameter includes but is not limited to: a source port number, a destination port number, a source MAC address, a destination MAC address, a TYPE ID in data, or the like. Correspondingly, the third communication apparatus may determine the second data packet based on the parameters of the plurality of data packets. The third communication apparatus adds the time information at a first location in the second data packet. Alternatively, the first communication apparatus determines, by using an AI algorithm, the second data packet including the to-be-deleted time information. Certainly, it may be learned from the foregoing that a sender, namely, the first communication apparatus, may determine the second data packet by using the AI algorithm, or a receiver, namely, the third communication apparatus, may determine the second data packet by using the AI algorithm, and then notify the first communication apparatus. Details are not described again.

The first location at which the first communication apparatus deletes the time information and the first location at which the third communication apparatus adds the time information may be pre-configured, or may be determined by the receiver or the sender by using the AI algorithm. Details are not described again. Optionally, the second data packet whose time information is deleted may further include first indication information, and the first indication information indicates a data packet whose time information is deleted.

Figure 7:
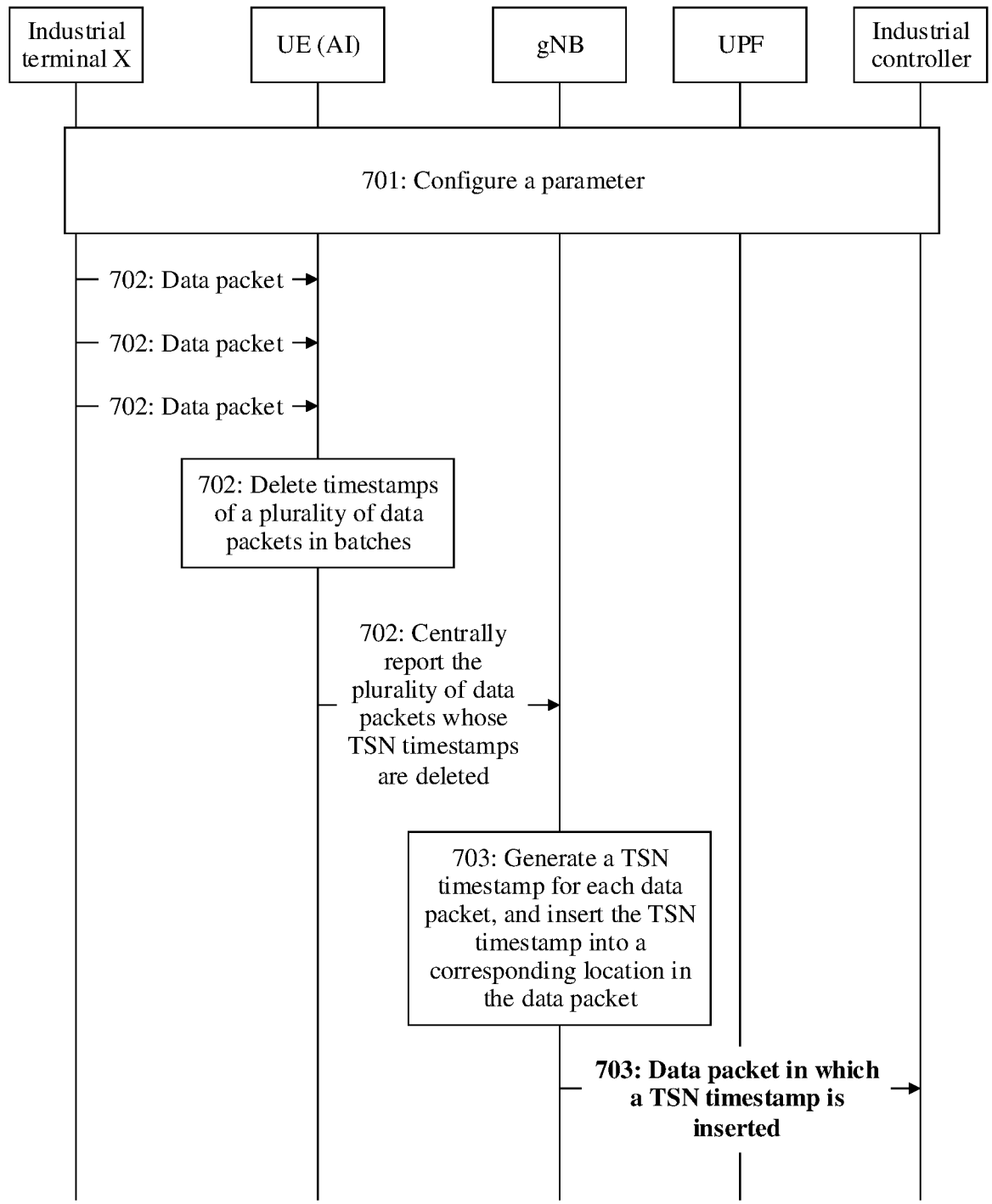
FIG. 7 is a schematic flowchart of a communication method according to Embodiment 4 of this application.

As shown in FIG. 7, for example, a first communication apparatus is UE, a second communication apparatus is an industrial terminal X, a third communication apparatus is a gNB, and time information is a TSN timestamp. The method includes but is not limited to the following steps.

Optionally, S701: Configure a parameter, including a service feature, for example, a source port number, a destination port number, a source MAC address, a destination MAC address, a TYPE ID in a data packet, a service periodicity, a maximum delay requirement, an actual transmission delay (deterministic transmission delay), a network element that deletes a timestamp, or a network element that supplements a timestamp. For detailed parameter configuration, refer to the record in Embodiment 2.

The following uses uplink data as an example to describe a data processing procedure in detail.

S702: The UE periodically receives a data packet from the industrial terminal X, where the data packet includes a TSN timestamp. For a periodic service, a TSN timestamp in a data packet in each periodicity also changes periodically. Each time the UE collects data packets for a period of time, the UE centrally transmits the data packets to the gNB. The UE may determine, by using a timer or a counter, an occasion for centrally transmitting the data packets to the gNB. A specific mechanism has been described in detail in Embodiment 1, and details are not described again. The UE deletes a TSN timestamp in each data packet, sorts, in a receiving time sequence, data packets whose TSN timestamps are deleted, generates reported data packets, and transmits the data packets to the gNB. It should be noted that, in Embodiment 1, when the UE centrally transmits a plurality of data packets to the gNB, a sequence of the reported data packets may be consistence or inconsistent with a sequence of receiving the data packets by the UE. However, in this embodiment, the sequence of data packets centrally reported by the UE needs to be consistent with the sequence of receiving the data packets by the UE.

S703: After receiving a plurality of data packets, the gNB generates a corresponding TSN timestamp for each data packet in a sequence of the plurality of data packets, inserts the TSN timestamp into a pre-configured bit location in the data packet, and transmits the data packet to the UPF. Then, the data packet is transmitted to an industrial controller.

For example, the UE receives a data packet 1 at a T1 moment of TSN time, receives a data packet 2 at a T2 moment of the TSN time, and receives a data packet 3 at a T3 moment of the TSN time. An interval between T1 and T2 is a periodicity T_P, and an interval between T2 and T3 is also the periodicity T_P. It is assumed that after receiving the data packet 3, the UE centrally transmits the data packet 1, the data packet 2, and the data packet 3 to the gNB, and a transmission delay is a deterministic delay value T_tans. The gNB receives the three data packets at a T4 moment of the TSN time. The gNB deduces, based on T4 and T_trans, that a timestamp of the data packet 3 is TSN time T3=T4−T_trans, and then deduces, based on a service periodicity, that a timestamp of the data packet 2 is TSN time T2=T3−T_p, and a timestamp of the data packet 1 is TSN time T1=T2−T_p. Then, the gNB supplements the deduced TSN timestamps in the three data packets respectively.

In the procedure in FIG. 7, it is assumed that the gNB maintains a TSN clock, and the gNB directly supplements a TSN timestamp that is based on the TSN clock. In an actual system, if a base station does not maintain the TSN clock, timestamp supplementation may also be performed. A conversion process is the same as Implementation A in S503 in Embodiment 2, and details are not described again. The foregoing procedure is described by using an example in which the gNB supplements the timestamp of the data packet. Actually, timestamp supplementation may also be performed by the UPF, and a procedure is similar to this. Details are not described herein again.

In this embodiment of this application, a sender removes a TSN timestamp in a data packet and then transmits the data packet, to reduce an amount of data transmitted in a 5G system, especially over an air interface. A plurality of data packets are simultaneously and centrally transmitted, so that additional transmission overheads are reduced and spectral efficiency is improved.

Embodiment 5

Embodiment 5 of this application provides a communication method. The method includes: A sender, namely, a first communication apparatus, predicts data packet content, and generates a predicted data packet. Before a real data packet arrives, the predicted data packet is sent first, so that a data transmission delay can be reduced.

Optionally, the foregoing fifth data packet is the predicted data packet, and may be generated by the first communication apparatus through prediction by using an AI algorithm. In the foregoing Embodiment 3, it is learned by using the AI algorithm that a specific bit in a data packet of a specific service is a TSN timestamp, to optimize the TSN timestamp. However, in this embodiment of this application, learning and prediction may be performed on the entire content of the data packet, to optimize transmission behavior. Due to an inherent feature of industrial production, an industrial terminal (for example, an operation arm) usually performs a same production procedure, and data packets with same content are repeatedly transmitted. After the AI algorithm is introduced, data can be learned and predicted, to optimize transmission.

A downlink data packet is used as an example. For example, an AI module in a gNB predicts the data packet. During actual implementation, an AI module on a UPF side may alternatively perform prediction, or an AI module in UE may perform prediction, and then notify the gNB of an algorithm for prediction, a parameter, and the like.

Figure 8:
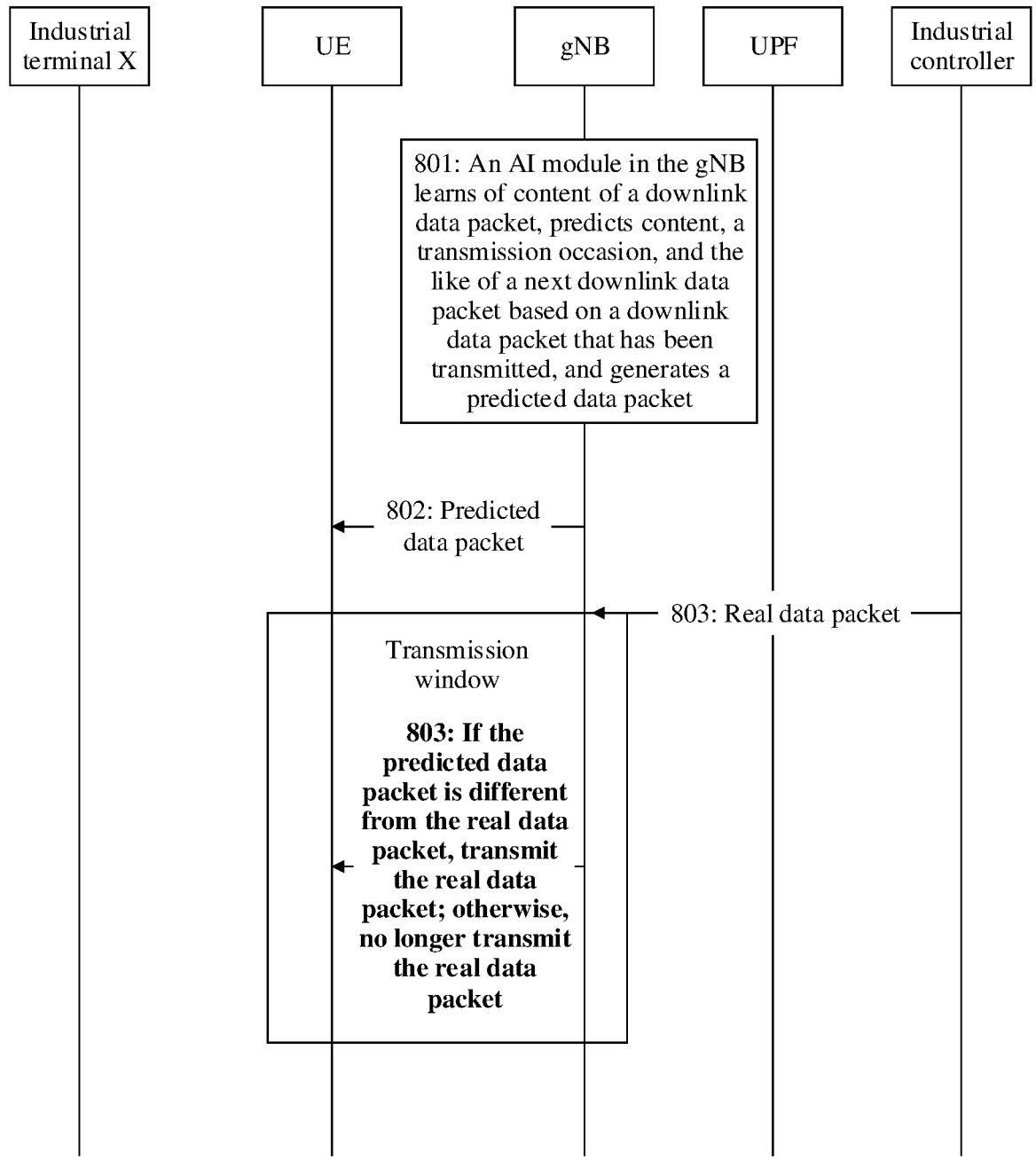
FIG. 8 is a schematic flowchart of a communication method according to Embodiment 5 of this application.

As shown in FIG. 8, a procedure of a communication method is provided. The procedure is described by using an example in which a first communication apparatus is a gNB, a second communication apparatus is a UPF, and a third communication apparatus is UE. The procedure includes but is not limited to the following:

S801: The gNB generates a predicted data packet. For example, an AI module in the gNB may learn of content of a downlink data packet, predict content, a transmission occasion, and the like of a next downlink data packet based on a downlink data packet that has been transmitted, and generate the predicted data packet. In FIG. 8, a white box indicates a transmission window of the predicted data packet. The gNB receives a real downlink data packet at a start moment of the window, and needs to transmit the real downlink data packet to a receiver at an end moment of the window.

S802: The gNB transmits the predicted data packet to the UE. Optionally, the gNB may transmit the predicted data packet to the UE before the transmission window of the data packet, that is, before receiving the real downlink data packet.

S803: The gNB receives the real data packet from the UPF. Optionally, the gNB may receive the real data packet from the UPF at the start moment of the transmission window. The gNB compares content of the real data packet with content of the predicted data packet. If the content is different, the gNB transmits the real data packet to the UE. If the content is the same, the gNB does not need to transmit the real data packet to the UE.

Optionally, if the gNB transmits the real data packet to the UE, further, processing at an air interface PDCP layer is different from that in an existing mechanism. For a sender, in the existing mechanism, a PDCP layer receives a predicted data packet, and allocates PDCP SN=K to the predicted data packet. When receiving a real data packet subsequently, the PDCP layer allocates PDCP SN=K+1 to the real data packet. In this embodiment of this application, the PDCP SN allocated to the real data packet is the same as that allocated to the predicted data packet, and both are K. For a receiver, in the existing mechanism, if a PDCP layer first receives a data packet with PDCP SN=K, and subsequently receives another data packet with PDCP SN=K, the receiver discards the subsequently received data packet, and delivers the previously received data packet to an application layer. However, in this embodiment of this application, the receiver discards the previously received data packet, and delivers the subsequently received data packet to the application layer. In other words, the receiver discards the previously received predicted data packet, and delivers the subsequently received real data packet to the application layer. Certainly, the foregoing description is provided by using an example in which there is one predicted data packet and one real data packet. If there are a plurality of predicted data packets and a plurality of real data packets, a procedure is similar to the foregoing procedure, and details are not described again.

In the existing mechanism, a PDCP serial number (SN) is increased by 1 each time the sender transmits a data packet. If the receiver receives a plurality of data packets with the same PDCP SN, the receiver discards the subsequent data packets and retains only the $1^{st}$ received data packet. In the procedure of this embodiment, when transmitting a real data packet, the PDCP layer of the sender, uses a same PDCP SN as that of the predicted data packet, that is, the sender sends two packets with the same PDCP SN. A difference lies in that if the receiver receives two data packets with the same PDCP SN, the receiver discards the previously received data packet and retains the subsequently received data packet, in other words, discards the predicted data packet and retains the real data packet.

Optionally, the procedure in FIG. 8 is described by using an example in which one data packet is predicted and transmitted each time, and is also applicable to a scenario in which a plurality of data packets are predicted and generated each time. In this case, the sender only needs to transmit some different data packets. For example, the sender predicts that a quantity of generated data packets is N1, and a quantity of actually arrived data packets is N2, where N1 and N2 are the same or different, and are both positive integers. When some of the N1 data packets are different from some of the N2 data packets, the transmitter may transmit the different data packets to the receiver. For example, three data packets are predicted and pre-transmitted, and corresponding PDCP SNs are respectively 3, 4, and 5. When real data packets arrive at the gNB, the gNB compares the real data packets with the predicted data packets. If the gNB finds that the three received real data packets are different from the predicted data packets, the gNB transmits the three real data packets, where corresponding PDCP SNs are respectively 3, 4, and 5. If the gNB finds that the real data packet 3 is the same as the predicted data packet, but the real data packet 4 and the real data packet 5 are different from the predicted data packet, the gNB transmits the two real data packets, where corresponding PDCP SNs are respectively 4 and 5. If a quantity of predicted data packets is less than a quantity of real data packets, the sender retransmits real data packets. For example, if a quantity of real data packets received by the gNB is greater than 3, where four data packets are used as an example, and content of the first three real data packets is the same as that of the predicted data packets, a real data packet is retransmitted, and a PDCP SN is 6. If a quantity of predicted data packets is greater than a quantity of real data packets, the sender sends a notification message to the receiver, to notify the receiver to delete redundant predicted data packets. The receiver may delete the redundant predicted data packets and does not deliver the redundant predicted data packets to the application layer. For example, if a quantity of real data packets received by the gNB is less than 3, where two real data packets are used as an example, and content of the real data packets is the same as that of the first two predicted data packets, the PDCP layer of the sender, generates a control PDU, and notifies the receiver to delete a data packet with PDCP SN=S and no longer deliver the data packet to the application layer. In this case of deleting the data packet, when the sender sends a next data packet, regardless of whether the next data packet is a predicted data packet or a real data packet, the PDCP SN may continue to be numbered (where in the foregoing example, after the receiver is notified to delete the data packet 5, the PDCP SN allocated to the next data packet is 6), or the same PDCP SN may be allocated again (where in the foregoing example, after the receiver is notified to delete the data packet 5, the PDCP SN allocated to the next data packet is still 5). A specific allocation manner that is used may be determined in a protocol, configured by using RRC, or the like. This is not limited.

It should be noted that, if the AI module is located on the UPF side, the UPF may predict a data packet to be transmitted, and then notifies the gNB. The foregoing procedure needs to be modified as follows: When the UPF transmits a predicted data packet to the gNB, a GTP SN in the General Packet Radio Service Tunneling Protocol (GPRS tunneling protocol, general packet radio service, GTP-U) of the predicted data packet is K, and a PDCP entity of the gNB allocates PDCP SN=M to the predicted data packet. If the UPF subsequently transmits a real data packet to the gNB, a GTP SN in GTP-U in the real data packet is still K. If the gNB receives two packets with the same GTP SN, it is considered that the UPF needs to transmit the real data packet. In this case, PDCP SN=M is allocated to the real data packet.

A scenario in which the UPF predicts and transmits a plurality of data packets each time is similar to the gNB prediction procedure described in the foregoing paragraph, and details are not described again.

Further, if the sender and the receiver use a data compression algorithm to compress a data packet actually transmitted over an air interface, an amount of data transmitted over the air interface may be further reduced. A typical data compression algorithm is, for example, uplink data compression (UDC). The UDC compression algorithm requires that both communication parties retain buffer content that is completely the same, and compression and decompression are performed on a data packet based on the buffer content. As data is transmitted, the buffer content is updated based on content of the transmitted data. For the procedure shown in FIG. 8, behavior of updating a UDC buffer may be performed in the following two scenarios.

Common behavior in the following two scenarios: The sender transmits a predicted data packet and updates a UDC buffer of the sender based on the predicted data packet. The receiver receives the predicted data packet, and updates a UDC buffer of the receiver based on the predicted data packet.

Scenario 1: Content of the predicted data packet is inconsistent with that of a real data packet. The real data packet is transmitted over the air interface. The gNB and the UE update UDC buffers based on the real data packet.

Scenario 2: Content of the predicted data packet is consistent with that of a real data packet. The real data packet is not transmitted over the air interface. The gNB and the UE do not update UDC buffers.

In the foregoing scenario 1, both the communication parties update the UDC buffers sequentially based on the predicted data packet and the real data packet, and finally the receiver delivers only the real data packet to the application layer. In the foregoing scenario 2, both the communication parties update the UDC buffers only once based on the predicted data packet.

In one of the foregoing scenarios, for example, the sender first predicts and transmits three data packets, PDCP SNs are respectively 3, 4, and 5, and there are only two real data packets. In this case, the PDCP layer of the sender generates a control PDU, and notifies the receiver to delete the data packet with PDCP SN=5 and not to deliver the data packet to the application layer. However, both the communication parties have updated the UDC buffers based on the predicted data packet with PDCP SN=5. Even if the data packet 5 is no longer delivered to the application layer, the updated UDC buffers does not need to be further updated.

The procedure in FIG. 8 is described by using downlink data as an example. A same procedure is also applicable to uplink data. The AI module on the UE side generates a predicted data packet and transmits the predicted data packet in advance. A process is similar to the foregoing description, and details are not described again.

In the procedure in FIG. 8, because a 5G system first transmits a predicted data packet and then transmits a real data packet (if the real data packet is inconsistent with the predicted data packet), a delay budget for transmitting the predicted data packet in the 5G system is longer than a delay budget for transmitting the real data packet. A manner such as hybrid automatic repeat request (HARQ) retransmission or automatic repeat request (ARQ) retransmission may be used, to reduce a requirement on a lower-layer transmission block error rate. After a period of time of learning, prediction accuracy of the AI module is improved. In most cases, content of the predicted data packet is the same as that of the real data packet, and the real data packet does not need to be transmitted again. For few cases in which predictions are inaccurate, the 5G system transmits the real data packet. Because a probability of transmitting the real data packet is low, the system may transmit the data packet in a more robust manner and use more radio resources to ensure transmission accuracy and real-time performance.

Embodiment 6

Embodiment 6 of this application provides a communication method. The communication method includes: A sender and a receiver, namely, a first communication apparatus and a third communication apparatus, jointly predict and generate a seventh data packet, where the seventh data packet is a predicted data packet. The first communication apparatus receives an eighth data packet from a second communication apparatus, where the eighth data packet is a real data packet. The first communication apparatus determines, based on the seventh data packet and the eighth data packet, whether to transmit the eighth data packet to the third communication apparatus. For example, if the seventh data packet is the same as the eighth data packet, in other words, the real data packet is the same as the predicted data packet, the eighth data packet is no longer sent to the third communication apparatus; otherwise, the eighth data packet is sent to the third communication apparatus. Correspondingly, if the receiver, namely, the third communication apparatus receives the real data packet, namely, the eighth data packet, the third communication apparatus delivers the eighth data packet to an application layer; otherwise, the third communication apparatus delivers the seventh data packet to the application layer. Optionally, if the third communication apparatus delivers the real eighth data packet to the application layer, the third communication apparatus deletes the predicted seventh data packet.

Optionally, the first communication apparatus and the second communication apparatus may predict the data packet by using an AI algorithm. In the solution of the foregoing Embodiment 5, only the sender starts the AI algorithm to perform prediction, and the receiver does not start the AI algorithm to perform prediction, so that a requirement of improving a capacity and reducing a data real-time performance requirement is met. On this basis, in Embodiment 6, an AI algorithm of the receiver is introduced for prediction, to further reduce an amount of data transmitted in a network and improve system efficiency.

Figure 9:
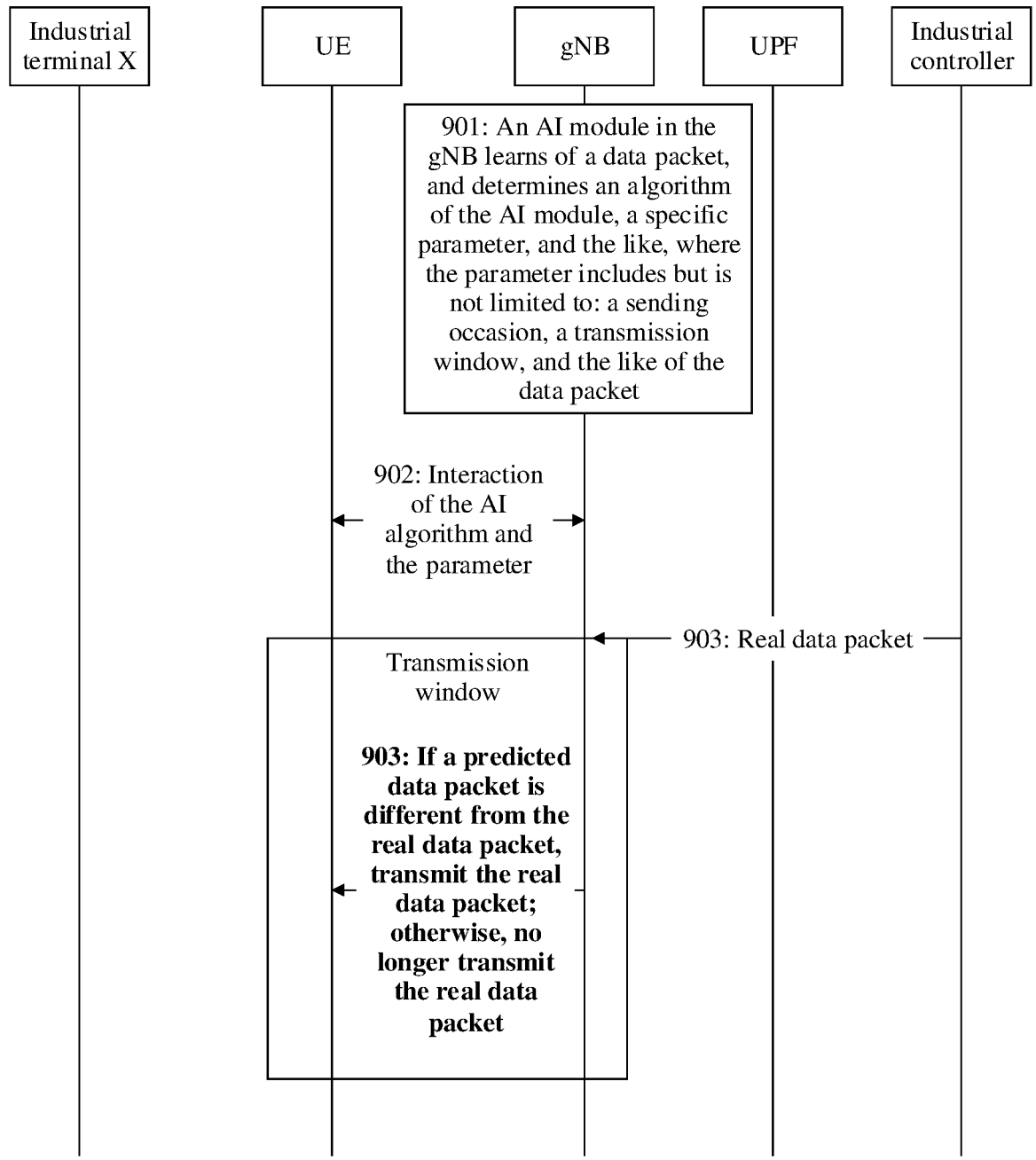
FIG. 9 is a schematic flowchart of a communication method according to Embodiment 6 of this application.

As shown in FIG. 9, a procedure of a communication method is provided. The procedure may be applied to downlink data packet transmission. An example in which a first communication apparatus is a gNB, a second communication apparatus is a UPF, and a third communication apparatus is UE is used for description.

Optionally, S901: An AI module in the gNB learns of a data packet, and determines an algorithm of the AI module, a specific parameter, and the like. The parameter includes but is not limited to: a sending occasion, a transmission window, and the like of the data packet. Alternatively, an AI module in the UE learns of a data packet, and determines an algorithm of the AI module, a specific parameter, and the like.

Optionally, S902: The gNB exchanges the algorithm of the AI module, the parameter, and the like with the UE, so that AI modules in the gNB and the UE are synchronized.

S903: The gNB generates a predicted data packet. Optionally, the AI module in the gNB may generate the predicted data packet before each transmission window (that is, a white box in the figure), that is, before a real data packet arrives at the gNB. The gNB receives the real data packet from the UPF. Optionally, the gNB may receive the real data packet from the UPF at a start moment of the transmission window. The gNB compares the real data packet with the predicted data packet. If the data packets are different, the gNB transmits the real data packet to the UE. If the data packets are the same, the gNB no longer transmits the real data packet to the UE.

The predicted data packet is generated for the receiver, namely, the UE. For example, the AI module in the UE generates the predicted data packet. If the UE receives the real data packet from the gNB, the UE delivers the real data packet to the application layer, and deletes the predicted data packet; otherwise, the UE delivers the predicted data packet to the application layer.

In this embodiment of this application, the UE, namely, the receiver, may generate the predicted data packet in the following two implementations. External behavior in the two implementations is the same, except that moments at which the internal AI module generates the predicted data packet are different. Specifically, Implementation A: The receiver generates the predicted data packet at the start moment of the transmission window each time. If the real data packet is received in the transmission window, the receiver delivers the real data packet to the application layer at an end moment of the transmission window. If no real data packet is received in the transmission window, the receiver delivers the predicted data packet to the application layer at the end moment of the transmission window.

Implementation B: If the real data packet is received in the transmission window, the receiver delivers the real data packet to the application layer at an end moment of the transmission window. If no real data packet is received in the transmission window, the receiver generates the predicted data packet and delivers the predicted data packet to the application layer at the end moment of the transmission window.

It should be noted that in the description of this application, the "application layer" may be further replaced with an "upper layer". An "access stratum" may include one or more of an SDAP layer, a PDCP layer, an RLC layer, a MAC layer, or a PHY layer. The upper layer may include an application (APP) layer. The access stratum and the upper layer may be adjacent protocol layers, or may be non-adjacent protocol layers. This is not limited. For example, an IP layer, a TCP layer, or a user datagram protocol (UDP) layer may be alternatively between the upper layer and the access stratum. This is not limited.

Optionally, the sender and the receiver may use a data compression algorithm to compress a data packet actually transmitted over an air interface, to reduce an amount of data transmitted over the air interface. A typical data compression algorithm includes UDC, and the like. The UDC compression algorithm requires that both communication parties retain buffer content that is completely the same, and compression and decompression are performed on a data packet based on the buffer content. As data is transmitted, the buffer content is updated based on content of the transmitted data. For example, the following two manners of updating a UDC buffer are provided.

Update manner A: The sender and the receiver update UDC buffers based on the real data packet only when the real data packet is transmitted over the air interface; otherwise, neither the sender nor the receiver updates the UDC buffer.

Update manner B: The UDC buffer is updated in each transmission window. If the real data packet is transmitted over the air interface, the receiver and sender update the UDC buffers based on the real data packet. If no real data packet is transmitted over the air interface, the sender and receiver update the UDC buffers based on the predicted data packet.

It should be noted that, in the foregoing embodiment, downlink data transmission is used as an example for description. The procedure is also applicable to uplink data transmission, and details are not described again. Both the communicating parties simultaneously predict a data packet. If the predicted data packet is the same as the real data packet, any data packet does not need to be transmitted. If the predicted data packet is different from the real data packet, the real data packet is then transmitted, to reduce an amount of data transmitted by a system in a 5G system.

It should be noted that, in at least one foregoing method embodiment, the network element such as the UE, the gNB, or the UPF may determine, by using the AI algorithm, a location of a TSN timestamp in a data packet, generate a predicted data packet, or the like. It may be understood that the network element such as the UE, the gNB, or the UPF may directly perform the foregoing operations by using the AI algorithm. Alternatively, when the network element such as the UE, the gNB, or the UPF includes the AI module, the AI module may be used to perform the foregoing operations. In this embodiment of this application, the foregoing two descriptions are used interchangeably.

The method described in embodiments of this application is described above in detail with reference to FIG. 1 and FIG. 9. The apparatus provided in embodiments of this application is described below in detail with reference to FIG. 10 and FIG. 11. It should be understood that the description of at least one apparatus embodiment corresponds to the description of at least one method embodiment. For content not described in detail, refer to the description in at least one foregoing method embodiment.

Figure 10:
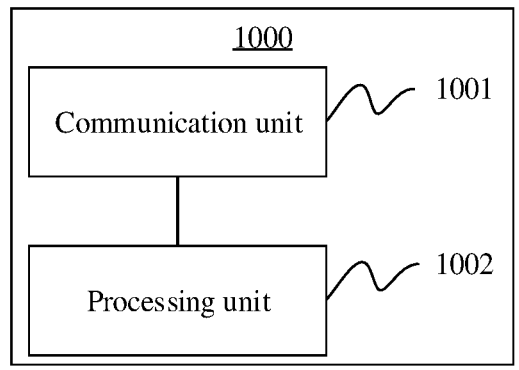
FIG. 10 is a schematic diagram of a structure of a communication apparatus according to at least one embodiment of this application.

FIG. 10 is a schematic block diagram of an apparatus 1000 according to at least one embodiment of this application, and is configured to implement the function of the first communication apparatus in at least one foregoing method embodiment. The apparatus may be a software unit or a chip system. The chip system may include a chip, or may include a chip or another discrete component. The apparatus may include a communication unit 1001, configured to communicate with the outside. The apparatus may further include a processing unit 1002, configured to perform processing.

In an example, the apparatus 1000 is configured to implement the step of the first communication apparatus in at least one foregoing method embodiment. The first communication apparatus may be a communication device, or may be a chip or a circuit disposed in the communication device. The communication unit 1001 is configured to perform the operations related to sending and receiving of the first communication apparatus in at least one foregoing method embodiment. The processing unit 1002 is configured to perform the processing-related operation of the first communication apparatus in at least one foregoing method embodiment.

For example, the communication unit 1001 is configured to receive a plurality of data packets from a second communication apparatus, where the plurality of data packets are data packets of a first service, the plurality of data packets are data packets in a plurality of periods, and a length of the periods of the plurality of data packets is less than a maximum delay of the first service. The communication unit 1001 is further configured to report the plurality of data packets to a third communication apparatus after an end moment of a first time period, where the maximum delay of the first service is not greater than, that is, less than or equal to a length of the first time period.

In another example, the apparatus 1000 is configured to implement the step of the third communication apparatus in at least one foregoing method embodiment. The third communication apparatus may be a communication device, or may be a chip or a circuit disposed in the communication device. The communication unit 1001 is configured to perform the operations related to sending and receiving of the third communication apparatus in at least one foregoing method embodiment. The processing unit 1002 is configured to perform the processing-related operation of the third communication apparatus in at least one foregoing method embodiment.

For example, the communication unit 1001 is configured to receive a plurality of data packets from a first communication apparatus after an end moment of a first time period, where the plurality of data packets are data packets of a first service, the plurality of data packets are data packets in a plurality of periods, a length of the periods of the plurality of data packets is less than a maximum delay of the first service, and a length of the first time period is not greater than the maximum delay of the first service.

In embodiments of this application, division into the units is an example, is merely division into logical functions, and may be other division during actual implementation. In addition, functional units in embodiments of this application may be integrated into one processor, or each of the units may exist alone physically, or two or more units may be integrated into one unit. The integrated unit may be implemented in a form of hardware, or may be implemented in a form of a software functional unit.

It can be understood that in the foregoing embodiment, functions of the communication unit can be implemented by a transceiver, and functions of the processing unit can be implemented by a processor. The transceiver may include a transmitter and/or a receiver, to respectively implement functions of a sending unit and/or a receiving unit. Descriptions are provided below by way of example with reference to FIG. 11.

Figure 11:
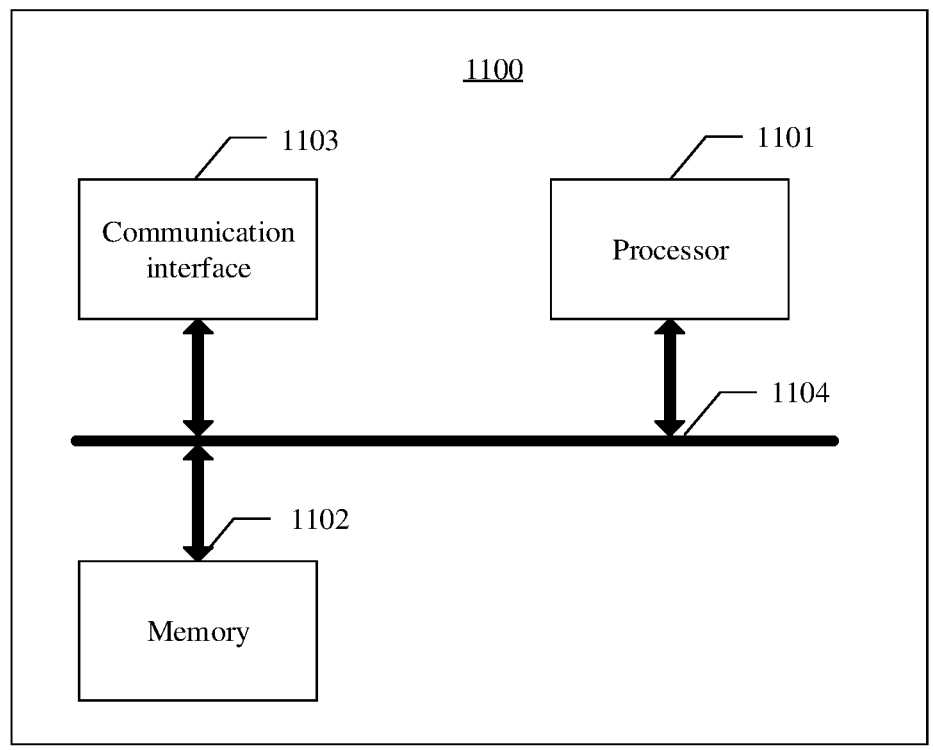
FIG. 11 is a schematic diagram of another structure of a communication apparatus according to at least one embodiment of this application.

A communication apparatus 1100 shown in FIG. 11 includes at least one processor 1101. The communication apparatus 1100 may further include at least one memory 1102, configured to store program instructions and/or data. The memory 1102 is coupled to the processor 1101. The coupling in this embodiment of this application is an indirect coupling or a communication connection between apparatuses, units, or modules, may be in an electrical form, a mechanical form, or another form, and is used for information exchange between the apparatuses, the units, or the modules. The processor 1101 may cooperate with the memory 1102, the processor 1101 may execute program instructions stored in the memory 1102, and at least one of the at least one memory 1102 may be included in the processor 1101.

The apparatus 1100 may further include a communication interface 1103, configured to communicate with another device through a transmission medium, so that the communication apparatus 1100 can communicate with the another device. In this embodiment of this application, the communication interface may be a transceiver, a circuit, a bus, a module, or a communication interface of another type. In this embodiment of this application, when the communication interface is the transceiver, the transceiver may include an independent receiver and an independent transmitter, or may be a transceiver integrated with a transceiver function, or may be an interface circuit.

It should be understood that connection media between the processor 1101, the memory 1102, and the communication interface 1103 are not limited in this embodiment of this application. In this embodiment of this application, in FIG. 11, the memory 1102, the processor 1101, and the communication interface 1103 are connected with each other by using a communication bus 1104. The bus is represented by a thick line in FIG. 11, and connection manners of other components are merely for schematic descriptions and are not construed as a limitation. The bus may include an address bus, a data bus, a control bus, and the like. For ease of representation, only one thick line is used to represent the bus in FIG. 11, but this does not mean that there is only one bus or only one type of bus.

In an example, the apparatus 1100 is configured to implement the step performed by the first communication apparatus in at least one method embodiment. The communication interface 1103 is configured to perform the operations related to sending and receiving of the first communication apparatus in at least one foregoing method embodiment, and the processor 1101 is configured to perform the processing-related operation of the first communication apparatus in at least one foregoing method embodiment.

For example, the communication interface 1103 is configured to receive a plurality of data packets from a second communication apparatus, where the plurality of data packets are data packets of a first service, the plurality of data packets are data packets in a plurality of periods, and a length of the periods of the plurality of data packets is less than a maximum delay of the first service. The communication interface 1103 is further configured to report the plurality of data packets to a third communication apparatus after an end moment of a first time period, where a length of the first time period is not greater than the maximum delay of the first service.

In another example, the apparatus 1100 is configured to implement the step performed by the third communication apparatus in at least one method embodiment. The communication interface 1103 is configured to perform the operations related to sending and receiving of the third communication apparatus in at least one foregoing method embodiment, and the processor 1101 is configured to perform the processing-related operation of the third communication apparatus in at least one foregoing method embodiment.

For example, the communication interface 1103 is configured to receive a plurality of data packets from a first communication apparatus after an end moment of a first time period, where the plurality of data packets are data packets of a first service, the plurality of data packets are data packets in a plurality of periods, a length of the periods of the plurality of data packets is less than a maximum delay of the first service, and a length of the first time period is not greater than the maximum delay of the first service.

Further, at least one embodiment of this application provides an apparatus. The apparatus is configured to perform the method in at least one foregoing method embodiment. A non-transitory computer-readable storage medium is provided, and includes a program. When the program is run by a processor, the method in at least one foregoing method embodiment is performed. A computer program product is provided. The computer program product includes computer program code. When the computer program code is run on a computer, the computer is enabled to implement the method in at least one foregoing method embodiment. A chip is provided, and includes a processor. The processor is coupled to a memory. The memory is configured to store a program or instructions. When the program or the instructions are executed by the processor, an apparatus is enabled to perform the method in at least one foregoing method embodiment.

In embodiments of this application, the processor may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams disclosed in embodiments of this application. The general-purpose processor may be a microprocessor, any processor, or the like. The steps of the method disclosed with reference to embodiments of this application may be directly presented as being performed and completed by a hardware processor, or performed and completed by a combination of hardware and a software module in a processor.

In embodiments of this application, the memory may be a non-volatile memory, for example, a hard disk drive (HDD) or solid-state drive (SSD); or may be a volatile memory, for example, a random-access memory (RAM). The memory is any other medium that can carry or store expected program code in a form of an instruction or a data structure and that can be accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of the instant application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD for short)), a semiconductor medium (for example, an SSD), or the like.

It is clear that a person skilled in the art can make various modifications and variations to this application without departing from the scope of this application. This application is intended to cover the modifications and variations of this application provided that they fall within the scope of the following claims and equivalent technologies of this application.

What is claimed is:

1. A communication method, wherein the method is performed by a first communication apparatus, and the method comprises:
receiving a plurality of data packets from a second communication apparatus, wherein
the plurality of data packets are data packets of a first service in a plurality of periods, and
a total length of the periods of the plurality of data packets is less than a maximum delay of the first service; and reporting the plurality of data packets to a third communication apparatus at an end moment of a first time period, wherein a length of the first time period is not greater than the maximum delay of the first service,
wherein the reporting the plurality of data packets to the third communication apparatus comprises:
  deleting time information of a second data packet in the plurality of data packets, wherein the second data packet is a data packet whose time information needs to be deleted in the plurality of data packets; and
  reporting the plurality of data packets to the third communication apparatus, and
wherein the deleting time information of the second data packet comprises:
  determining the second data packet by using an artificial intelligence (AI) algorithm;
  determining a first location of the time information in the second data packet by using the AI algorithm; and
  deleting the time information of the second data packet at the first location.

2. The method according to claim 1, wherein
the first time period is equal to duration of a timer, and the receiving the plurality of data packets from the second communication apparatus comprises:
  starting the timer upon receiving, from the second communication apparatus, the $1^{st}$ data packet in the plurality of data packets; and
the reporting the plurality of data packets to the third communication apparatus comprises:
  reporting the plurality of data packets to the third communication apparatus upon expiration of the timer.

3. The method according to claim 1, wherein
the receiving the plurality of data packets from the second communication apparatus comprises:
  starting a counter upon receiving, from the second communication apparatus, the 1st data packet in the plurality of data packets; and
the reporting the plurality of data packets to the third communication apparatus comprises:
  reporting the plurality of data packets to the third communication apparatus upon a count value of the counter reaching a threshold, wherein the threshold is determined based on a length of each of the periods of the plurality of data packets and the maximum delay of the first service.

4. The method according to claim 1, wherein
the second data packet reported to the third communication apparatus comprises first indication information, and the first indication information indicates a data packet whose time information has been deleted.

5. A communication apparatus, comprising:
a transceiver configured to receive a plurality of data packets from a second communication apparatus, wherein
  the plurality of data packets are data packets of a first service in a plurality of periods,
  a total length of the periods of the plurality of data packets is less than a maximum delay of the first service, and
  the maximum delay of the first service is not less than a length of a first time period; and
a processor configured to delete time information of a second data packet in the plurality of data packets, wherein the second data packet is a data packet whose time information needs to be deleted in the plurality of data packets;
wherein the transceiver is configured to report the plurality of data packets, including the second data packet whose time information has been deleted, to a third communication apparatus at an end moment of the first time period;
wherein the processor is configured to:
  based on at least one parameter of the second data packet, determine that the second data packet includes a time-sensitive network (TSN) timestamp as the time information to be deleted, and
  delete the TSN timestamp from the second data packet; and
wherein the at least one parameter, based on which the processor is configured to determine that the second data packet includes the TSN timestamp to be deleted, comprises a destination-side TSN translator (DS-TT) port number included in the second data packet.

6. The apparatus according to claim 5, wherein
the first time period is equal to duration of a timer;
the processor is configured to start the timer upon the transceiver receiving, from the second communication apparatus, the $1^{st}$ data packet in the plurality of data packets; and
the transceiver is configured to report the plurality of data packets to the third communication apparatus upon expiration of the timer.

7. The apparatus according to claim 5, wherein
the processor is configured to start a counter upon the transceiver receiving, from the second communication apparatus, the $1^{st}$ data packet in the plurality of data packets; and
the transceiver is configured to report the plurality of data packets to the third communication apparatus upon a count value of the counter reaching a threshold, wherein the threshold is determined based on a length of each of the periods of the plurality of data packets and the maximum delay of the first service.

8. The apparatus according to claim 5, wherein
the processor is configured to:
  delete the TSN timestamp at a first location in the second data packet, wherein the first location is pre-configured.

9. The apparatus according to claim 5, wherein
the second data packet reported to the third communication apparatus comprises first indication information, and the first indication information indicates a data packet whose time information has been deleted.

10. The apparatus according to claim 5, wherein
the at least one parameter, based on which the processor is configured to determine that the second data packet includes the TSN timestamp to be deleted, further comprises:
  a destination MAC address included in the second data packet.

11. The apparatus according to claim 5, wherein
the at least one parameter, based on which the processor is configured to determine that the second data packet includes the TSN timestamp to be deleted, further comprises:
  a medium access control (MAC) address of an industrial terminal included in the second data packet.

12. The apparatus according to claim 5, wherein
the at least one parameter, based on which the processor is configured to determine that the second data packet includes the TSN timestamp to be deleted, further comprises:
   a type identifier (TYPE ID) included in the second data packet.

13. A communication apparatus, comprising:
a transceiver configured to receive a plurality of data packets from a first communication apparatus at an end moment of a first time period, wherein
   the plurality of data packets are data packets of a first service in a plurality of periods,
   a total length of the periods of the plurality of data packets is less than a maximum delay of the first service, and
   a length of the first time period is not greater than the maximum delay of the first service; and
a processor configured to add time information to a second data packet in the plurality of data packets, wherein the second data packet is a data packet whose time information is deleted in the plurality of data packets,
wherein the processor is configured to:
   determine, by using an artificial intelligence (AI) algorithm, the second data packet whose time information is deleted in the plurality of data packets;
   determine a first location in the second data packet by using the AI algorithm; and
   add the time information at the first location in the second data packet.

14. The apparatus according to claim 13, wherein
the processor is further configured to:
   determine the time information of the second data packet based on the periods of the plurality of data packets.

15. The apparatus according to claim 13, wherein
the processor is further configured to:
   determine receiving time of the $1^{st}$ data packet in the plurality of data packets; and
   determine the time information of the second data packet based on the receiving time and a transmission delay of the $1^{st}$ data packet.

* * * * *